United States Patent
Barker et al.

(10) Patent No.: US 6,706,445 B2
(45) Date of Patent: Mar. 16, 2004

(54) SYNTHESIS OF LITHIATED TRANSITION METAL TITANATES FOR LITHIUM CELLS

(75) Inventors: Jeremy Barker, Shipton-Under-Wychwood (GB); M. Yazid Saidi, Henderson, NV (US); Jeffrey L. Swoyer, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 212 days.

(21) Appl. No.: 09/969,439

(22) Filed: Oct. 2, 2001

(65) Prior Publication Data

US 2003/0073001 A1 Apr. 17, 2003

(51) Int. Cl.[7] .................................................. H01M 4/48
(52) U.S. Cl. ................................. 429/231.1; 429/231.5; 423/71; 423/593
(58) Field of Search ..................... 423/71, 598, 593; 429/231.5, 231.1

(56) References Cited

U.S. PATENT DOCUMENTS

| | | | | |
|---|---|---|---|---|
| 1,166,547 A | * | 1/1916 | Rossi et al. ................... | 423/71 |
| 2,508,878 A | | 5/1950 | Yates et al. | |
| 2,570,232 A | | 10/1951 | Hansgirg | |

(List continued on next page.)

FOREIGN PATENT DOCUMENTS

| | | | |
|---|---|---|---|
| EP | 0 630 064 A1 | | 12/1994 |
| EP | WO 00/44965 A1 | * | 8/2000 |
| EP | 1049182 A2 | | 11/2000 |
| EP | 1094533 A1 | | 4/2001 |
| JP | 56162477 | | 12/1981 |
| JP | 62176054 | | 8/1987 |
| JP | 9134724 | | 5/1997 |
| JP | 9134725 | | 5/1997 |
| JP | 10 251020 A1 | | 9/1998 |
| JP | 11233143 A | * | 8/1999 .......... H01M/10/40 |
| JP | 2001-08-5010 | | 3/2001 |
| JP | 2001-11-0414 | | 4/2001 |
| RU | 2038395 | | 6/1995 |
| WO | WO 00/44965 A1 | | 8/2000 |
| WO | WO 01/13445 A1 | | 2/2001 |

OTHER PUBLICATIONS

Gummow, et al., Lithium extraction from orthorhombic lithium manganese oxide and the phase transformation to spinel, Mater. Res. Bull. (1983), 28(12), 1249–56.

Gummow, et al., An investigation of spinel–related and orthorhombic LiMnO2 cathodes for rechargeable lithium batteries, J. Electrochem. Soc. (1994), 141(5), 1178–82.

Otsuka, et al., Hydrogen production from water by indium (III) oxide and potassium carbonate using graphite, active carbon and biomass as reductants, Chem. Lett. (1981), (3), 347–50.

(List continued on next page.)

*Primary Examiner*—Carol Chaney
(74) *Attorney, Agent, or Firm*—Cynthia S. Kovacevic; Roger A. Williams; Michael D. Ross

(57) ABSTRACT

An electrochemical active material contains a lithiated zirconium, titanium, or mixed titanium/zirconium oxide. The oxide can be represented by the formula $LiM'M''XO_4$, where M' is a transition metal, M'' is an optional three valent non-transition metal, and X is zirconium, titanium, or a combination of the two. Preferably, M' is nickel, cobalt, iron, manganese, vanadium, copper, chromium, molybdenum, niobium, or combinations thereof. The active material provides a useful composite electrode when combined with a polymeric binder and electrically conductive material. The active material can be made into a cathode for use in a secondary electrochemical cell. Rechargeable batteries may be made by connecting a number of such electrochemical cells.

27 Claims, 14 Drawing Sheets

U.S. PATENT DOCUMENTS

| | | | |
|---|---|---|---|
| 3,865,745 A | | 2/1975 | Block et al. |
| 4,177,060 A | | 12/1979 | Tylko |
| 5,240,794 A | | 8/1993 | Thackeray et al. |
| 5,281,496 A | | 1/1994 | Clarke |
| 5,316,877 A | | 5/1994 | Thackeray et al. |
| 5,384,291 A | | 1/1995 | Weimer et al. |
| 5,478,674 A | | 12/1995 | Miyasaka |
| 5,512,214 A | * | 4/1996 | Koksbang .................. 252/506 |
| 5,607,297 A | | 3/1997 | Henley et al. |
| 5,683,835 A | * | 11/1997 | Bruce ........................ 429/224 |
| 5,803,947 A | | 9/1998 | Engell et al. |
| 5,958,362 A | * | 9/1999 | Takatori et al. .......... 423/593.1 |
| 6,085,015 A | | 7/2000 | Armand et al. |
| 6,103,419 A | | 8/2000 | Saidi et al. |
| 6,514,640 B1 | * | 2/2003 | Armand et al. ........... 429/231.1 |
| 6,528,033 B1 | * | 3/2003 | Barker et al. ................ 423/306 |
| 2002/0192137 A1 | * | 12/2002 | Chaloner-Gill et al. ..... 423/306 |

OTHER PUBLICATIONS

Vasyutinskii, Appearance of emf. during ferric oxide reduction by carbon, Zh. Prikl. Khim. (1973), 46(4), 779–82 (Abstract).

Gilchrist, Extraction Metallurgy, Pergamon Press (1980), pp. 160–173.

PCT Search Report for PCT/US02/31781, dated Feb. 24, 2003.

* cited by examiner

US 6,706,445 B2

SYNTHESIS OF LITHIATED TRANSITION METAL TITANATES FOR LITHIUM CELLS

FIELD OF THE INVENTION

The present invention relates to lithium cells based on lithiated transition metal titanates. More particularly, it provides active materials useful as a cathode (positive electrode) active material and an anode (negative electrode) active material for use in secondary electrochemical cells.

BACKGROUND OF THE INVENTION

Lithium batteries are prepared from one or more electrochemical cells. Non-aqueous lithium electrochemical cells typically include a negative electrode, a lithium electrolyte prepared from a lithium salt dissolved in one or more organic solvents, and a positive electrode of an electrochemically active material, typically a chalcogenide of a transition metal. During discharge, lithium ions from the negative electrode pass through the liquid electrolyte to the electrochemically active material of the positive electrode, where the ions are taken up with the simultaneous release of electrical energy. Thus on discharge, the positive electrode functions as a cathode, and the negative electrode as an anode. To reflect this fact, the terms "positive electrode" and "cathode" will be used interchangeably in the description and claims, as will the terms "negative electrode" and "anode". During charging, the flow of ions is reversed so that lithium ions pass from the positive electrode through the electrolyte and are plated back onto the negative electrode.

Recently, the lithium metal anode has been replaced with a carbon anode such as coke or graphite in which lithium ions can be inserted to form $Li_xC_6$. In the operation of the cell, lithium passes from the carbon through the electrolyte to the cathode where it is taken up just as in a cell with a metallic lithium anode. During recharge, the lithium is transferred back to the anode where it re-inserts into the carbon. Because no metallic lithium is present in the cell, melting of the anode does not occur even under abusive conditions. Also, because lithium is reincorporated into the anode by insertion or intercalation rather than by plating, dendritic and spongy lithium growth does not occur. Non-aqueous lithium electrochemical cells are discussed, for example, in U.S. Pat. Nos. 4,472,487, 4,668,595, and 5,028,500. These cells are often referred to as "rocking chair" batteries because lithium ions move back and forth between the insertion or intercalation compounds during charge/discharge cycles.

Known positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known. The lithium cobalt oxide, the lithium manganese oxide, and the lithium nickel oxide have a common disadvantage in that the charge capacity of a cell comprising such cathodes may suffer a significant loss in capacity. That is, the initial capacity available (amp hours/gram) from $LiMn_2O_4$, $LiNiO_2$, and $LiCoO_2$ is less than the theoretical capacity because significantly less than 1 atomic unit of lithium engages in the electrochemical reaction. Such an initial capacity value is significantly diminished during the first cycle operation and such capacity further diminish in successive cycles of operation. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing electrode material having acceptable capacity without disadvantage of significant capacity loss when used in a cell.

Japanese Patent No. 08180875 to Aichi Seiko discloses a lithium secondary battery having a cathode made of an active material consisting of a lithium metal titanate of structure $LiTiMO_4$ wherein M is manganese, iron, chromium, nickel, cobalt, magnesium, and/or boron.

Lithium ion technology, and the associated lithium containing compounds useful as cathode active materials in such batteries, have given the industry needed flexibility in designing electrochemical cells for a wide variety of technological uses. However, the industry is constantly seeking for new materials to provide even greater flexibility in design parameters, ease of construction, and increased energy density.

SUMMARY OF THE INVENTION

Figure 1:
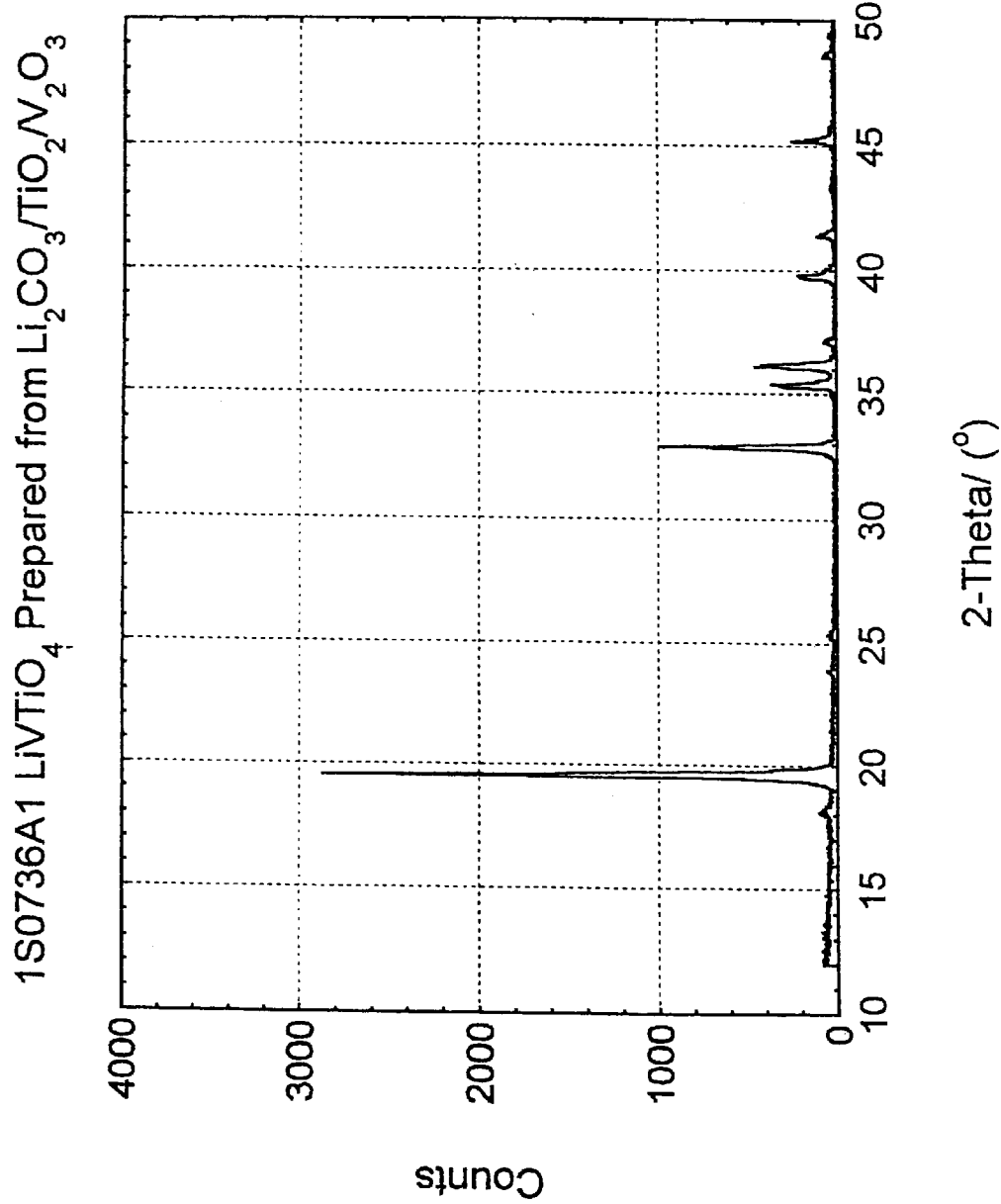
FIG. 1 is an x-ray diffraction pattern of $LiVTiO_4$ made from lithium carbonate.

The present invention provides an electrochemical active material containing a lithiated zirconium, titanium, or mixed titanium/zirconium oxide. The oxide can be represented by the formula $LiM'_aM''_{1-a}XO_4$, where M' is a transition metal or combination of transition metals, M'' is a non-transition metal, a is greater than zero and less than or equal to 1, and X is zirconium, titanium, or combinations thereof. Preferably, M' is titanium, nickel, cobalt, iron, manganese, vanadium, copper, chromium, molybdenum, niobium, or combinations thereof. The active material provides a useful composite electrode when combined with a polymeric binder and electrically conductive material. The active material can be made into a cathode for use in a secondary electrochemical cell. Rechargeable batteries may be made by connecting a number of such electrochemical cells.

In another embodiment, some of the materials may also be used as anode materials.

DETAILED DESCRIPTION OF THE INVENTION

The active material of the present invention contains a lithiated titanium or zirconium oxide of general formula $$Li_n M'_a M''_{1-a} Ti_b Zr_{1-b} O_4$$

wherein M' represents a transition metal or a mixture of transition metals, M" represents a non-transition metal or a mixture of non-transition metals, a and b are independently greater than or equal to 0 and less than or equal to 1, and n ranges from about 0.01 to 2. When n is less than 1.0, M' and M" must take on an average oxidation state greater than +3. When n is greater than 1.0, then M' and M" must take on an average oxidation state less than +3. Preferably, n is at least 0.2, and more preferably at least 0.5. In a preferred embodiment, n is about 1.0. Preferred transition metals include titanium, vanadium, manganese, iron, chromium, nickel, cobalt, molybdenum, niobium, and combinations thereof. When b is 1 (i.e., when the active materials are titanates), M' comprises at least vanadium. When b is equal to zero (i.e., when the active materials comprise zirconates), and M' is titanium, an active material of the invention may be represented by $LiTiZrO_4$. Representative non-transition metals include aluminum, boron, indium, gallium, antimony, bismuth, thallium, and combinations thereof.

The active material can be mixed with a polymeric binder and an electrically conductive material to form an electrode material. The electrode material can then be made into an electrode using conventional techniques.

In a preferred embodiment, the active materials of the invention serve as cathode (positive electrode) active materials. The cathode active material of the invention may be mixed or diluted with another cathode active material, electronically conducting material, solid electrolyte, or compatible inert material. A cathode is readily fabricated from individual or mixed cathode active materials.

In one aspect, the active materials of the invention are lithium vanadium titanates of general formula $$Li_n V Ti O_4$$

wherein n is from 0.01 to about 2. In one embodiment, the active materials are the source of lithium in a lithium ion battery. In such an application, n is preferably at least 0.2, and more preferably at least 0.5. In a preferred embodiment, n is 1.0.

In another aspect of the invention, the active materials contain lithiated metal zirconates or mixed titanates and zirconates of general formula $$Li_n M'_a M''_{1-a} Ti_b Zr_{1-b} O_4$$

wherein a is from 0 to 1, inclusive, and b is less than one and greater than or equal to zero, n is from 0.01 to 2, M' represents a transition metal or mixture of transition metals, and M" represents a non-transition metal or mixture of non-transition metals. Preferably, n is at least 0.2, and more preferably at least 0.5. In a preferred embodiment, n is about 1.0. The transition metal M' is preferably selected from the group consisting of titanium, vanadium, manganese, iron, chromium, nickel, cobalt, molybdenum, niobium, and combinations thereof. In a preferred embodiment, M' is at least vanadium.

In yet another aspect of the invention, there are provided anode or negative electrode active materials which are lithiated metal titanates and/or zirconates represented by the general formula $$Li_n M'_a M''_{1-a} Ti_b Zr_{1-b} O_4,$$

wherein n is from 0.01 to about 2, a is greater than zero and less than or equal to one, b is greater than or equal to zero and less than or equal to one, M' is a transition metal or mixture of transition metals, and M" represents a +3 non-transition metal or mixture of non-transition metals. Preferably, M' comprises one or more transition metals selected from the group consisting of titanium, vanadium, manganese, iron, chromium, nickel, cobalt, molybdenum, and niobium. In a preferred embodiment, M' is at least chromium. Preferably, n is at least 0.2, and more preferably at least 0.5. In a preferred embodiment, n is about 1.0.

Active materials having the formulas noted above are conveniently synthesized by carrying out solid state reaction of starting materials which provide the metal elements and lithium of the active materials. For example, titanium and zirconium are conveniently provided as titanium dioxide and zirconium dioxide starting materials respectively. When the metals M, M', and/or M" are provided as oxide starting materials, the starting materials can be represented by the formulas $M_2O_3$, $MO_2$, and $M_2O_5$ for metals in an oxidation state of +3, +4, and +5 respectively. It is also possible to provide the metals as hydroxides of general formula $M(OH)_3$, $M(OH)_4$ and the like for metals of different oxidation states. A wide variety of materials is suitable as starting material sources of lithium. One preferred lithium starting material is lithium carbonate.

The solid state synthesis may be carried out with or without reduction. When the active materials are to be synthesized without reduction, the starting materials are simply combined in a stoichiometric ratio and heated together to form active materials of the desired stoichiometry. Active materials having a range of values n for the lithium subscript can be made by providing metals M or mixtures of metals M' and M" in average oxidation states ranging from +2 (in which case n will be 2.0 for charge balance), to +3 (in which case n will be 1.0 for charge balance) up to about 3.9 (in which case n will be 0.1) or even up to 3.99 (for n=0.01). For example, the titanium or zirconium may be provided in the +4 oxidation state, while the metals M and alternatively M' or M" are provided in a +3 oxidation state, for example as oxides or hydroxides, to form active materials where n is 1.0. When the solid state reaction is carried out in the presence of a reducing agent, it is possible to use metals as starting materials having initially higher oxidation states, and it is possible to incorporate lithium at non-integer levels between about 0.01 and 2 as before. During the reaction, the oxidation state of the starting material metal is reduced. Either the reducing agent or the lithium compound can serve as limiting reagent. However, when the reducing agent is limiting, the active material will contain unreacted lithium compound as an impurity. When the lithium containing compound is limiting, the reducing agent will remain in excess after the reaction. Commonly used reducing agents include elemental carbon and hydrogen gas as illustrated below in the Examples. In the case of carbon as a reducing agent, the remaining excess carbon does not harm the active material because carbon is itself part of the electrodes made from such active materials. When the reducing agent is hydrogen gas, any excess reducing agent is not incorporated into the starting material because the hydrogen volatilizes and can be removed. For these reasons, it is preferred to carry out reductive solid state reactions where the lithium compound is limiting in a stoichiometric sense. By selecting the amount of lithium compound as limiting reagent, it is possible to prepare lithiated titanium or zirconium oxides of general formula

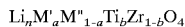
$$Li_nM'_aM''_{1-a}Ti_bZr_{1-b}O_4$$

where n ranges from about 0.01 up to about 2. Formally, the titanium/zirconium element is in a +4 oxidation state, while the oxidation state of M' and M'' will take on an average oxidation state of +(4-n) to provide charge balance in the formula.

A preferred method of synthesis is a carbothermal reduction where carbon is used as reducing agent as discussed above. The reducing carbon may be provided as elemental carbon, such as in the form of graphite or carbon black. Alternatively, the reducing carbon may be generated in situ during the reaction by providing the reducing carbon in the form of a precursor that decomposes or carbonizes to produce carbon during the reaction. Such precursors include, without limitation, cokes, starch, mineral oils, and glycerol and other organic materials, as well as organic polymers that can form carbon material in situ on heating. In a preferred embodiment, the source of reducing carbon undergoes carbonization or decomposition at a temperature below which the other starting materials react.

Thus, the lithiated mixed metal titanates/zirconates of the invention can be prepared with a carbothermal preparation method using as starting materials a lithium source, a titanium and/or zirconium compound or compounds, and a metal source. Examples of lithium sources include without limitation lithium acetate, lithium hydroxide, lithium nitrate, lithium oxalate, lithium oxide, lithium phosphate, lithium dihydrogen phosphate and lithium carbonate, as well as hydrates of the above. Mixtures of the lithium sources can also be used. Examples of metal sources include, without limitation, carbonates, phosphates, sulfates, oxides, hydroxides, carboxylates, acetates, silicates, and other compounds of transition metals and non-transition metals. Non-transition metals include boron, the lanthanide series metals, and the alkaline earth metals, as well as the elements Al, Ga, In, Tl, Ge, Sn, Pb, Sb, Bi, and Po. Mixtures of metal sources may be used. Preferred metal sources include the oxides, dioxides, trioxides and hydroxides discussed above. In a preferred embodiment, the metal source is chosen from among compounds of metals M' and M'' as defined in the formula above. The titanium and/or zirconium compounds can be selected from a wide range of compounds, including those described above for the metal source, as well as titanates or zirconates such as lithium titanate and lithium zirconate. Preferred zirconium and titanium compounds include titanium dioxide, zirconium dioxide, and combinations thereof.

In the carbothermal reductive method, the starting materials are mixed together with reducing carbon, which is included in an amount sufficient to reduce a metal ion of one or more of the metal-containing starting materials. The carbothermal conditions are set such as to ensure the metal ion does not undergo full reduction to the elemental state. Excess quantities of one or more starting materials other than carbon may be used to enhance product quality. For example, a 5% to 10% excess may be used. The carbon starting material may also be used in excess. When the carbon is used in stoichiometric excess over that required to react as reductant with the molybdenum source, an amount of carbon, remaining after the reaction, functions as a conductive constituent in the ultimate electrode formulation. This is considered advantageous for the further reason that such remaining carbon will in general be intimately mixed with the product active material. Accordingly, excess carbon is preferred for use in the process, and may be present in a stoichiometric excess amount of 100% or greater. The carbon present during compound formation is thought to be intimately dispersed throughout the precursor and product. This provides many advantages, including the enhanced conductivity of the product. The presence of carbon particles in the starting materials is also thought to provide nucleation sites for the production of the product crystals.

The starting materials are intimately mixed and then reacted together where the reaction is initiated by heat and is preferably conducted in a non-oxidizing, inert atmosphere. Before reacting the compounds, the particles are mixed or intermingled to form an essentially homogeneous powder mixture of the precursors. In one aspect, the precursor powders are dry-mixed using a ball mill and mixing media, such as zirconia. Then the mixed powders are pressed into pellets. In another aspect, the precursor powders are mixed with a binder. The binder is selected so as to not inhibit reaction between particles of the powders. Therefore, preferred binders decompose or evaporate at a temperature less than the reaction temperature. Examples include, without limitation, mineral oils, glycerol, and polymers that decompose to form a carbon residue before the reaction starts. In still another aspect, intermingling can be accomplished by forming a wet mixture using a volatile solvent and then the intermingled particles are pressed together in pellet form to provide good grain-to-grain contact.

Although it is desired that the precursor compounds be present in a proportion which provides the stated general formula of the product, the lithium compound may be present in an excess amount on the order of 5 percent excess lithium compared to a stoichiometric mixture of the precursors. As noted earlier, carbon may be present in stoichiometric excess of 100% or greater. A number of lithium compounds are available as precursors, such as lithium acetate ($LiOCOCH_3$), lithium hydroxide, lithium nitrate ($LiNO_3$), lithium oxalate ($Li_2C_2O_4$), lithium oxide ($Li_2O$), lithium phosphate ($Li_3PO_4$), lithium dihydrogen phosphate ($LiH_2PO_4$), and lithium carbonate ($Li_2CO_3$). Preferred lithium sources include those having a melting point higher than the temperature of reaction. In such cases, the lithium source tends to decompose in the presence of the other precursors and/or to effectively react with the other precursors before melting. For example, lithium carbonate has a melting point over 600° C. and commonly reacts with the other precursors before melting.

The method of the invention is able to be conducted as an economical carbothermal-based process with a wide variety of precursors and over a relatively broad temperature range. The reaction temperature for reduction depends on the metal-oxide thermodynamics, for example, as described in Ellingham diagrams showing the ΔG (Gibbs Free Energy Change) versus T (temperature) relationship. As described earlier, it is desirable to conduct the reaction at a temperature where the lithium compound reacts before melting. In general, the temperature should desirably be about 400° C. or greater, preferably 450° C. or greater, and more preferably 500° C. or greater. Higher temperatures are preferred because the reaction generally will normally proceed at a faster rate at higher temperatures. The various reactions involve production of CO or $CO_2$ as an effluent gas. The equilibrium at higher temperature favors CO formation.

Generally, higher temperature reactions produce CO effluent while lower temperatures result in $CO_2$ formation from the starting material carbon. At higher temperatures where CO formation is preferred, the stoichiometry requires more carbon be used than the case where $CO_2$ is produced. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range above about 650° C. While there is not believed to be a theoretical upper limit, it is thought that temperatures higher than 1200° C. are not needed. Also, for a given reaction with a given amount of carbon reductant, the higher the temperature the stronger the reducing conditions.

In one aspect, the method of the invention utilizes the reducing capabilities of carbon in a controlled manner to produce desired products having structure and lithium content suitable for electrode active materials. The method of the invention makes it possible to produce products containing lithium, metal and oxygen in an economical and convenient process. The ability to lithiate precursors, and change the oxidation state of a metal without causing abstraction of oxygen from a precursor is advantageous. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state. The method utilizes an effective combination of quantity of carbon, time and temperature to produce new products and to produce known products in a new way.

Referring back to the discussion of temperature, at about 700° C. both the carbon to carbon monoxide and the carbon to carbon dioxide reactions are occurring. At closer to 600° C. the C to $CO_2$ reaction is the dominant reaction. At closer to 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

It is preferred to heat the starting materials at a ramp rate of a fraction of a degree to 10° C. per minute and preferably about 2° C. per minute. Once the desired reaction temperature is attained, the reactants (starting materials) may be held at the reaction temperature for several hours. Although the reaction may be carried out in oxygen or air, the heating is preferably conducted under an essentially non-oxidizing atmosphere. The atmosphere is preferably essentially non-oxidizing so as not to interfere with the reduction reactions taking place. An essentially non-oxidizing atmosphere can be achieved, for example, through the use of vacuum or inert gases such as argon. Although some oxidizing gas (such as oxygen or air) may be present, it should not be at so great a concentration that it interferes with the carbothermal reduction or lowers the quality of the reaction product. It is believed that any oxidizing gas present will tend to react with the carbon and lower the availability of the carbon for participation in the reaction. To a large extent, such a contingency can be anticipated and accommodated by providing an appropriate excess of carbon as a starting material. Nevertheless, it is generally preferred to carry out the carbothermal reduction in an atmosphere containing as little oxidizing gas as practical.

Advantageously, a reducing atmosphere is not required, although it may be used if desired. After reaction, the products are preferably cooled from the elevated temperature to ambient (room) temperature (i.e., 10° C. to 40° C.). Desirably, the cooling occurs at a rate similar to the earlier ramp rate, and preferably 2° C./minute cooling. Such cooling rate has been found to be adequate to achieve the desired structure of the final product. It is also possible to quench the products at a cooling rate on the order of about 100° C./minute. In some instances, such rapid cooling (quench) may be preferred.

The invention also provides for electrochemical cells made from electrodes containing the active materials described above. An electrochemical cell contains an anode and a cathode. In one embodiment, the electrochemical cells include a cathode containing the active material of the present invention and an intercalation based anode, with both anode and cathode capable of reversibly incorporating, by intercalation or other insertion process, an alkali metal ion. The electrochemical cells also contain an electrolyte composition which in a preferred embodiment contains a polymeric matrix and an electrolyte solution. The electrolyte solution is made up of an organic electrolyte solvent and a salt of an alkali metal. Each electrode preferably has a current collector.

Rechargeable batteries of the invention may be made by interconnecting two or more electrochemical cells of the invention in an appropriate series/parallel arrangement to provide the required operating voltage in current levels.

Lithium ion batteries containing cathodes having active materials of the invention are generally operated according to known principles. An electrochemical cell is first provided in a discharged state. In the discharged state, the cathode or positive electrode contains an active material based on a compound of general structure

$$Li_n M'_a M''_{1-a} Ti_b Zr_{1-b} O_4$$

wherein n is from about 0.01 to 2, a is greater than zero and less than or equal to 1, and b is from 0 to 1. M' comprises one or transition metals, preferably selected from the group consisting of titainium, vanadium, manganese, iron, chromium, nickel, cobalt, molybdenum, and niobium, with the proviso that when b is 1, M' comprises at least vanadium. M" is selected from the group consisting of aluminum, boron, indium, gallium, antimony, bismuth, thallium, and combinations thereof.

The subscript n gives the number of lithium ions in the active material of the invention. It can range from fractional values that are quite low, up to values greater than 1 and as high as two. It can take on values between the two extremes according to the desired properties, such as theoretical specific capacity of the active material or the discharge capacity of the battery. It is preferably greater than about 0.5 and will commonly be close to or equal to 1.0.

After the electrochemical cell is provided as above in the discharged condition, it is put through a charging step to produce a battery in a charged or partially charged condition. Charging is generally accomplished by applying an outside electromotive force to the cell so as to cause the migration of lithium ions from the cathode to the anode. The anode contains an insertion or intercalation material such as carbon. Migration of lithium ions to the anode results in insertion of lithium into the lattice of the insertion material. At the same time, lithium is removed from the cathode, until an amount c is removed. When charged, the anode thus contains insertion material with inserted lithium atoms. For example, when the insertion material of the anode is graphitic, the inserted lithium atoms form a composition that can be represented by the formula $Li_mC_6$, where m represents the fractional content of lithium in the carbon environment. Correspondingly, the cathode in the charged battery has a lowered lithium content. The cathode material can be represented as $$Li_{n-c} \; M'_a M''_{1-a} \; Ti_b \; Zr_{1-b} \; O_4$$

where c represents an amount of lithium ions removed or removable from the cathode during the charging step. In this example, it can be seen that the cathode material in the uncharged and charged conditions can be represented by the last formula above. In the (first) uncharged condition, c is equal to 0. In the (second) charged or partially charged condition, c is greater than 0. It will be appreciated that in the formula above, c reaches a maximum value characteristic of the material at the point at which the cell is fully charged. At intermediate stages of the charging process, c takes on a value greater that zero but less than its maximum.

After charging, the cell is put through a discharging process. Typically, a load is applied to a circuit containing the battery or cell, and current flow from the battery or cell is used to operate the load. During discharge, lithium ions migrate to the cathode, along with electrons (via the external circuit) that cause the reduction of the cathode material. Lithium ions are re-inserted into the cathode. Generally, a first cycle charge inefficiency is observed due, it is believed, to creation of a passivation film on the anode. On subsequent cycles with high-quality electrode or cathode materials, the amount of lithium extracted on charging will be approximately the same as the amount of lithium re-inserted on discharging. Cells containing such high-quality materials are generally preferred because their reversibility leads to a longer cycle life, so that the battery can be charged and re-charged a number of times.

When the active material of the invention is used as an anode material, the operation of the battery is similar. As before, the battery is first prepared in a discharged condition, with the anode containing active material of formula $$Li_n \; M'_a M''_{1-a} \; Ti_b \; Zr_{1-b} \; O_4$$

where n, a, b, M', and M" are as defined above. The active material serves as a lithium insertion material analogously to the carbonaceous insertion anode described above.

After construction, the battery is first put through a charging process. During charging, lithium ions from the cathode migrate to the anode, where they are inserted in the active anode material to form a material that can be represented by the formula $$Li_{n+c} \; M'_a M''_{1-a} \; Ti_b \; Zr_{1-b} \; O_4$$

where c represents the amount of lithium inserted into the anode active material during the charging step. It can be seen that the anode material in the uncharged and charged states can be represented by the last formula above. In the first (uncharged) condition, c is equal to 0. In the (second) charged condition, c is greater than 0. As before, c reaches a maximum characteristic of the material at the point at which the cell is fully charged. At intermediates stages of charging, c takes on a value greater than 0 but less than its maximum.

After charging, the cell is put through a discharging process, as before. During discharge, lithium ions are re-inserted into the cathode material. With high quality anode materials, the amount of lithium inserted during the charging step and the amount of lithium extracted on discharge will be approximately the same so that a highly reversible cell is formed, leading to long cycle life and re-chargeability in a battery, as indicated above.

Reversibility of electrochemical cells made with active materials of the invention can be explained on a chemical basis as shown above. That is, in reversible cells, theoretically the amount of lithium being shuttled between the anode and cathode on successive charge/discharge cycles remains relatively constant. The extent of the change in the amount of lithium transferred between electrodes over time can be observed in measurements of capacity fade.

In preferred embodiments, both the anode and cathode include a current collector that comprises, for example, a foil, a screen, grid, expanded metal, woven or non-woven fabric, or knitted wire formed from an electron conductive material such as metals or alloys. Particularly preferred current collectors comprise perforated metal foils or sheets. In order to minimize the weight of the electrochemical cell, thin current collectors are preferred. Each current collector is also connected to a current collector tab which extends from the edge of the current collector. The anode tabs can be welded together and connected to a lead. The cathode tabs are similar welded and connected to a lead. External loads can be electrically connected to the leads. Current collectors and tabs are described in U.S. Pat. Nos. 4,925,752, 5,011, 501, and 5,326,653, which are incorporated herein by reference.

In addition to the anode and cathode, the cells and batteries of the invention contain an electrolyte composition. The electrolyte composition generally contains from about 5 to about 25% preferably from about 10 to about 20%, and more preferably from about 10–15% of an inorganic salt wherein the percentages are based on the total weight of the electrolyte composition. The percentage of salt depends on the type of salt and electrolytic solvent employed.

The inorganic ion salt of the electrolyte composition refers to any salt suitable in a non-aqueous electrolyte composition. Representative examples of suitable inorganic ion salts are metal salts of less mobile anions of weak bases having a large anionic radius. Examples of such anions include without limitation, $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include, without limitation, $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte composition further contains up to about 95 weight percent of a solvent based on the total weight of the electrolyte composition. The solvent of the electrolyte composition is generally a low molecular weight organic solvent added to the electrolyte composition which may also serve the purpose of solvating the inorganic ion salt. The solvent can in general be any compatible, relatively non-volatile, and relatively polar aprotic solvent. Preferably, the solvents have boiling points greater than about 85° C. to simplify manufacture and increase the life of the electrolyte and battery. Typical examples of suitable solvents include organic carbonates as well as other solvents such as gamma-butyrolactone, triglyme, tetraglyme, dimethylsulfoxide, dioxolane, sulfolane, and mixtures thereof. When using propylene carbonate based electrolytes in an electrolytic cell with graphite anodes, a sequestering agent, such as a crown ether, can be added in the electrolyte.

Suitable organic carbonates are in general those with no more than about twelve carbon atoms, and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 4,4-dimethyl-1,3-dioxan-2-one; 5,5-dimethy-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; and 4,4,6-trimethyl-1,3-dioxan-2-one.

Linear aliphatic carbonates are also suitable for use in the invention. Examples include, without limitation, dimethyl carbonate (DMC), dipropyl carbonate (DPC), diethyl carbonate (DEC), methyl ethyl carbonate (MEC), and the like. Several of these cyclic and linear aliphatic carbonates are commercially available such as propylene carbonate, ethylene carbonate, and dimethyl carbonate.

In one embodiment, the electrolyte composition also contains from about 5 to about 30 weight percent, preferably from about 15 to about 25 weight percent of a solid polymeric matrix based on the total weight of the electrolyte composition. In this embodiment, suitable solid polymeric matrixes are well known in the art and include inorganic polymers, organic polymers, or a mixture of organic polymers with inorganic non-polymeric materials. Suitable inorganic non-polymeric materials include without limitation, β-alumina, silver oxide, lithium iodide, and the like.

The anode of the electrochemical cells of the invention typically comprises a compatible anodic material which is any material which functions as an anode in a solid electrolytic cell, such as, in certain cases, the anode negative active materials of the present invention. Other compatible anodic materials are well known in the art include, without limitation, lithium, lithium alloys, such as alloys of lithium with aluminum, mercury, manganese, iron, zinc, and insertion or intercalation based anodes such as those employing carbon, tungsten oxides, and the like. Preferred anodes include lithium insertion- or intercalation anodes employing carbon materials such as graphite, cokes, mesocarbons, and the like. Such carbon insertion-based anodes typically include a polymeric binder having a molecular weight of from about 1,000–5,000,000, and optionally, an extractable plasticizer suitable for forming a bound porous composite. Examples of suitable polymeric binders include, without limitation, EPDM (ethylene propylene diamine termonomer), PVDF (polyvinylidene difluoride), EAA (ethylene acrylic acid copolymer), EVA (ethylene vinyl acetate copolymer), EAA/EVA copolymers, vinylidene fluoride hexafluoropropylene copolymers, and the like.

The cathode typically comprises a compatible cathodic material which is any material that functions as a positive pole in an electrolytic cell. The cathode of the present invention includes the lithiated transition metal zirconium or titanium oxides of the present invention, but may also include other cathodic materials. Such other cathodic materials may include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-α-$MnO_2$ ($0\leq y<1$) which is $Li_yNH_4Mn_8O_{16}$ ($0\leq y<1$) which has a hollandite-type structure. $Li_y$-α-$MnO_2$ where $0\leq y<0.5$ is preferred. α-$MnO_2$ can be synthesized by precipitation from a reaction between a $MnSO_4$ solution and $(NH_4)_2S_2O_8$ as an oxidizing agent.

In a preferred embodiment, the compatible cathodic material of the present invention is mixed with a polymeric binder such as described above in regard to the anode.

The cathode and anode generally further comprise one or more electrically conductive materials. Examples of such materials include, without limitation, graphite, powdered carbon, powdered nickel, metal particles, and conductive polymers. Conductive polymers are characterized by a conjugate network of double bonds. Examples include, without limitation, polypyrrole and polyacetylene.

The invention has been described above with respect to particular preferred embodiments. Further non-limiting examples of the invention are given in the examples that follow.

EXAMPLES

General methods for preparation of the various active materials of the invention will be described in this section. In some cases, materials prepared in the Examples are further characterized by electrochemical and other means. The results of such characterization are given in the Figures and the discussion below. A Siemens D500 X-ray Diffractometer equipped with Cu $K_\alpha$ radiation ($\lambda=1.54056$ Å) was used for X-ray diffraction (XRD) studies of the prepared materials.

The Examples give synthesis schemes for preparing compounds of the general formula $$LiM'_aM''_{1-a}Ti_bZr_{1-b}O_4$$

wherein M' represents a transition metal, M" represents a valence +3 non-transition metal, a and b are independently greater than or equal to 0 and less than or equal to 1. That is, in the embodiments exemplified below, lithium is present in the compounds at a molar amount of unity. It is to be understood that active materials having non-unity values of lithium content can be prepared by using as starting materials relatively more or less lithium compound.

To illustrate, compounds of general structure $LinM'aM''_{1-a}Ti_bZr_{1-b}O_4$ can be prepared according to the Examples by using as starting material an amount of $0.5n\ Li_2CO_3$ instead of the listed 0.5.

Example 1

Preparation of $LiVTiO_4$ from $Li_2CO_3/TiO_2/V_2O_3$

The general reaction may be summarized:

0.5 $Li_2CO_3$+$TiO_2$+0.5 $V_2O_3$→$LiVTiO_4$+0.5 $CO_2$ 0.5 g-mol of $Li_2CO_3$ is equivalent to 36.95 g 1.0 g-mol of $TiO_2$ is equivalent to 79.88 g 0.5 g-mol of $V_2O_3$ is equivalent to 74.94 g 1.740 g of $Li_2CO_3$ (Pacific Lithium Company), 3.760 g of $TiO_2$ (Aldrich Chemical) and 3.530 g of $V_2O_3$ (Alfa Aesar) were used. The precursors were initially pre-mixed using a mortar and pestle and the mixture was then pelletized. The pellet was then transferred to a temperature-controlled tube furnace equipped with an argon gas flow. The sample was heated at a ramp rate of 2°/minute to an ultimate temperature of 900° C. and maintained at this temperature for 8 hours. The sample was then cooled to room temperature, before being removed from the tube furnace for analysis. The powderized sample showed good uniformity, was hard and appeared gray in color with a black metallic sheen.

FIG. 1 shows the x-ray diffraction pattern for this $LiVTiO_4$ sample. The data appear fully consistent with the published data of Arillo et al., Solid State Ionics volume 107, page 307, published in 1998, for the compositionally similar $LiFeTiO_4$. In the Fe material the x-ray diffraction data is consistent for a cubic spinel structure with the space group Fd3m.

Example 2

Preparation of $LiVTiO_4$ from $LiOH.H_2O/TiO_2/V_2O_3$

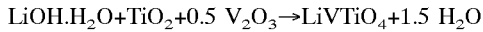

The general reaction may be summarized:

$LiOH.H_2O+TiO_2+0.5\ V_2O_3 \rightarrow LiVTiO_4+1.5\ H_2O$ 1.0 g-mol of $LiOH.H_2O$ is equivalent to 41.96 g 1.0 g-mol of $TiO_2$ is equivalent to 79.88 g 0.5 g-mol of $V_2O_3$ is equivalent to 74.94 g 1.24 g of $LiOH.H_2O$ (Aldrich Chemical), 2.35 g of $TiO_2$ (Aldrich Chemical) and 2.21 g of $V_2O_3$ (Alfa Aesar) were used. The precursors were initially pre-mixed using a mortar and pestle and the mixture was then pelletized. The pellet was then transferred to a temperature-controlled tube furnace equipped with an argon gas flow. The sample was heated at a ramp rate of 2°/minute to an ultimate temperature of 900° C. and maintained at this temperature for 8 hours. The sample was then cooled to room temperature, before being removed from the tube furnace for analysis. The powderized sample showed reasonable uniformity, was hard and appeared black in color.

Figure 2:
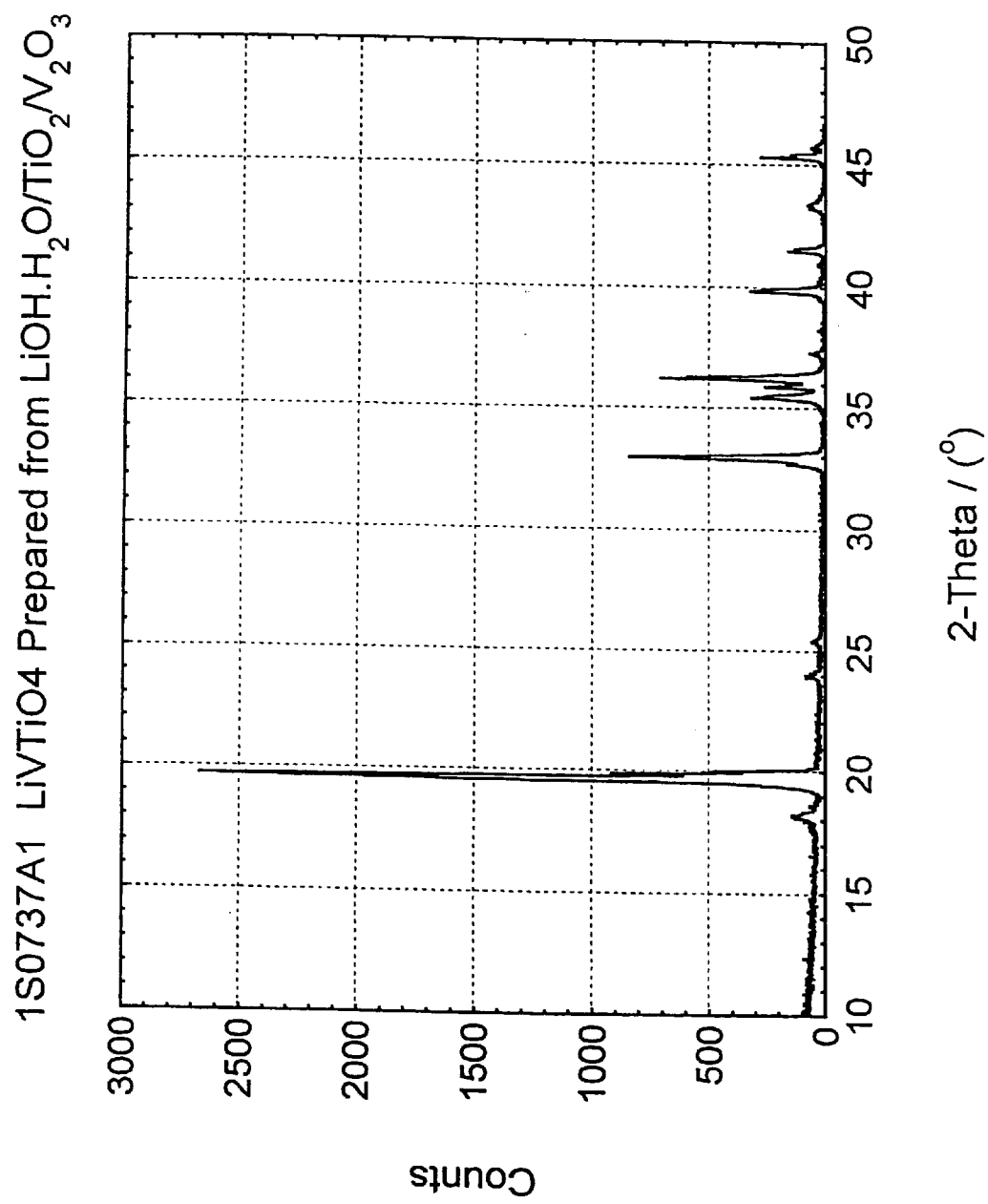
FIG. 2 is an x-ray diffraction pattern of $LiVTiO_4$ made from lithium hydroxide.

FIG. 2 shows the x-ray diffraction pattern for this $LiVTiO_4$ sample. The data appear fully consistent with the published data of Arillo et al. Solid State Ionics 107, 307 (1998) for the compositionally similar $LiFeTiO_4$. In the Fe material the x-ray diffraction data is consistent for a cubic spinel structure with the space group Fd3m.

Example 3

Preparation of $LiVTiO_4$ from $Li_2CO_3/TiO_2/V_2O_5$ (Under a Reducing Atmosphere)

The general reaction, conducted under a flowing hydrogen atmosphere, may be summarized:

$H_2+0.5\ Li_2CO_3+TiO_2+0.5\ V_2O_5 \rightarrow LiVTiO_4+0.5\ CO_2+H_2O$ 0.5 g-mol of $Li_2CO_3$ is equivalent to 36.95 g 1.0 g-mol of $TiO_2$ is equivalent to 79.88 g 0.5 g-mol of $V_2O_5$ is equivalent to 90.94 g 1.74 g of $Li_2CO_3$ (Pacific Lithium Company), 3.76 g of $TiO_2$ (Aldrich Chemical) and 4.28 g of $V_2O_5$ (Alfa Aesar) were used. The precursors were initially pre-mixed using a mortar and pestle and the mixture was then pelletized. The pellet was then transferred to a temperature-controlled tube furnace equipped with a hydrogen gas flow. The sample was heated at a ramp rate of 2°/minute to an ultimate temperature of 900° C. and maintained at this temperature for 8 hours.

The sample was then cooled to room temperature, before being removed from the tube furnace for analysis. The powderized sample was soft and appeared black in color.

Example 4

Preparation of $LiVTiO_4$ from $Li_2CO_3/TiO_2/V_2O_5$ Using Carbothermal Reduction The general reaction, conducted under an inert atmosphere, may be summarized:

$0.5\ Li_2CO_3+TiO_2+0.5\ V_2O_5+C \rightarrow LiVTiO_4+0.5\ CO_2+CO$ 0.5 g-mol of $Li_2CO_3$ is equivalent to 36.95 g 1.0 g-mol of $TiO_2$ is equivalent to 79.88 g 0.5 g-mol of $V_2O_5$ is equivalent to 90.94 g The precursors are initially pre-mixed, in the proportions shown above, using a mortar and pestle and then pelletized. The pellet is then transferred to a temperature-controlled tube furnace equipped with an inert atmosphere gas flow. The sample is then heated at an appropriate rate to an ultimate temperature in the approximate range 650–900° C. The chosen temperature range assumes the a $C \rightarrow CO$ carbothermal reduction mechanism. The sample is maintained at this temperature for a time long enough to ensure complete reaction. The sample is then cooled to room temperature, before being removed from the tube furnace for analysis.

Example 5

Preparation of $LiCrTiO_4$ from $Li_2CO_3/TiO_2/Cr_2O_3$

The general reaction may be summarized:

$0.5\ Li_2CO_3+TiO_2+0.5\ Cr_2O_3 \rightarrow LiCrTiO_4+0.5\ CO_2$ 0.5 g-mol of $Li_2CO_3$ is equivalent to 36.95 g 1.0 g-mol of $TiO_2$ is equivalent to 79.88 g 0.5 g-mol of $Cr_2O_3$ is equivalent to 76.00 g 1.73 g of $Li_2CO_3$ (Pacific Lithium Company), 3.56 g of $TiO_2$ (Aldrich Chemical) and 3.74 g of $Cr_2O_3$ (Alfa Aesar) were used. The precursors were initially pre-mixed using a mortar and pestle and the mixture was then pelletized. The pellet was then transferred to a temperature-controlled tube furnace equipped with an argon gas flow. The sample was heated at a ramp rate of 2°/minute to an ultimate temperature of 900° C. and maintained at this temperature for 8 hours. The sample was then cooled to room temperature, before being removed from the tube furnace for analysis. The powderized sample showed good uniformity, and appeared yellow/green in color.

Figure 3:
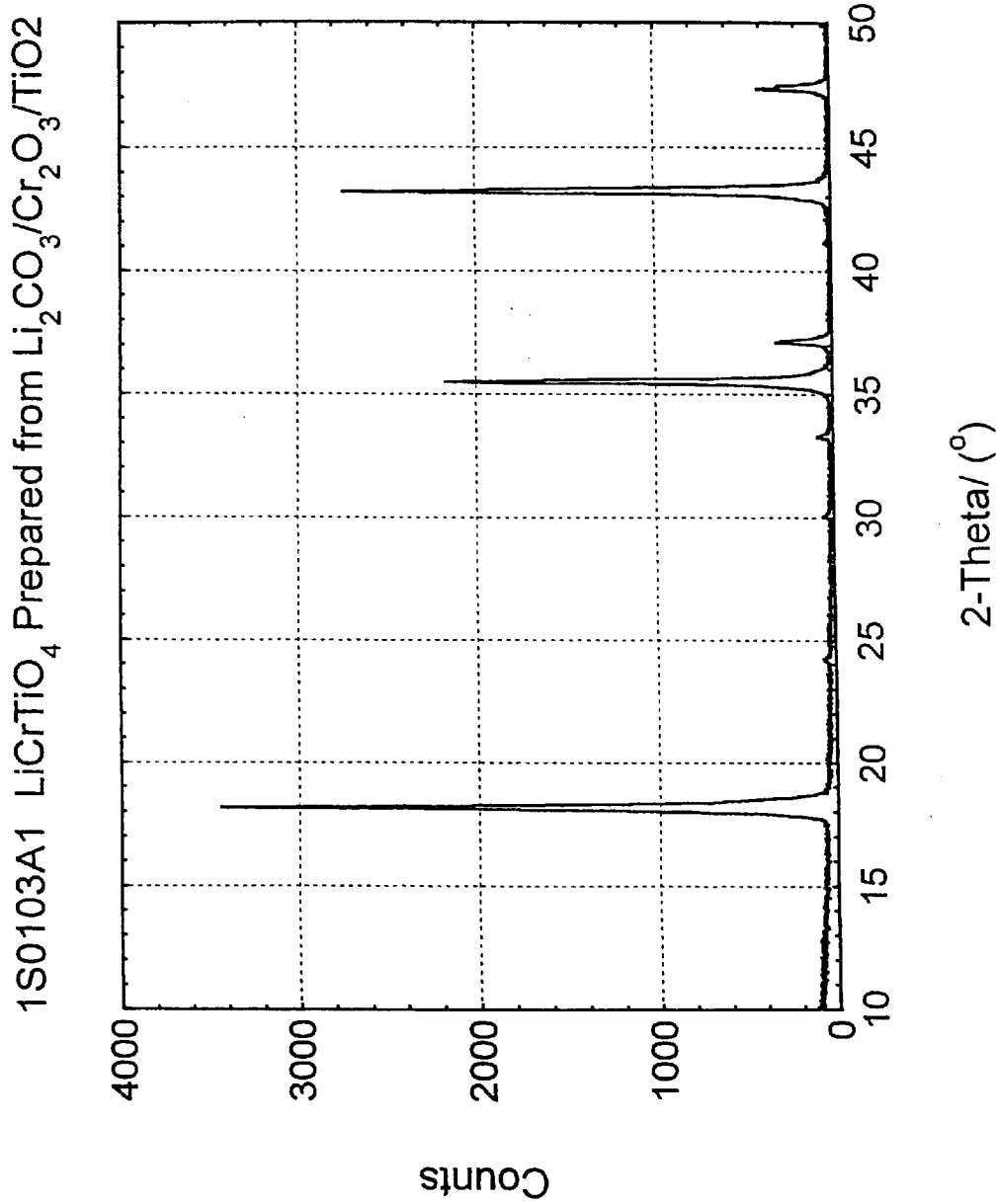
FIG. 3 is an x-ray diffraction pattern of synthesized $LiCrTiO_4$.

FIG. 3 shows the x-ray diffraction pattern for this $LiCrTiO_4$ sample. Structural refinement gave cubic space group Fd3m, a=8.397 Å, and a unit cell volume of 592.14 Å$^3$. The data appear fully consistent with the published data of Arillo et al. Solid State Ionics 107, 307 (1998) for the compositionally similar $LiFeTiO_4$. In the Fe material the x-ray diffraction data is consistent for a cubic spinel structure with the space group Fd3m.

Example 6

Preparation of $LiMnTiO_4$ from $Li_2CO_3/TiO_2/Mn_2O_3$

The general reaction may be summarized:

$0.5\ Li_2CO_3+TiO_2+0.5\ Mn_2O_3 \rightarrow LiMnTiO_4+0.5\ CO_2$ 0.5 g-mol of $Li_2CO_3$ is equivalent to 36.95 g 1.0 g-mol of $TiO_2$ is equivalent to 79.88 g 0.5 g-mol of $Mn_2O_3$ is equivalent to 78.94 g 1.70 g of $Li_2CO_3$ (Pacific Lithium Company), 3.68 g of $TiO_2$ (Aldrich Chemical) and 3.63 g of $Mn_2O_3$ (Alfa Aesar) were used. The precursors were initially pre-mixed using a mortar and pestle and the mixture was then pelletized. The pellet was then transferred to a temperature-controlled tube furnace equipped with an argon gas flow. The sample was heated at a ramp rate of 2°/minute to an ultimate temperature of 900° C. and maintained at this temperature for 8 hours. The sample was then cooled to room temperature, before being removed from the tube furnace for analysis. The powderized sample showed good uniformity, was semi-hard and appeared black/gray in color.

Figure 4:
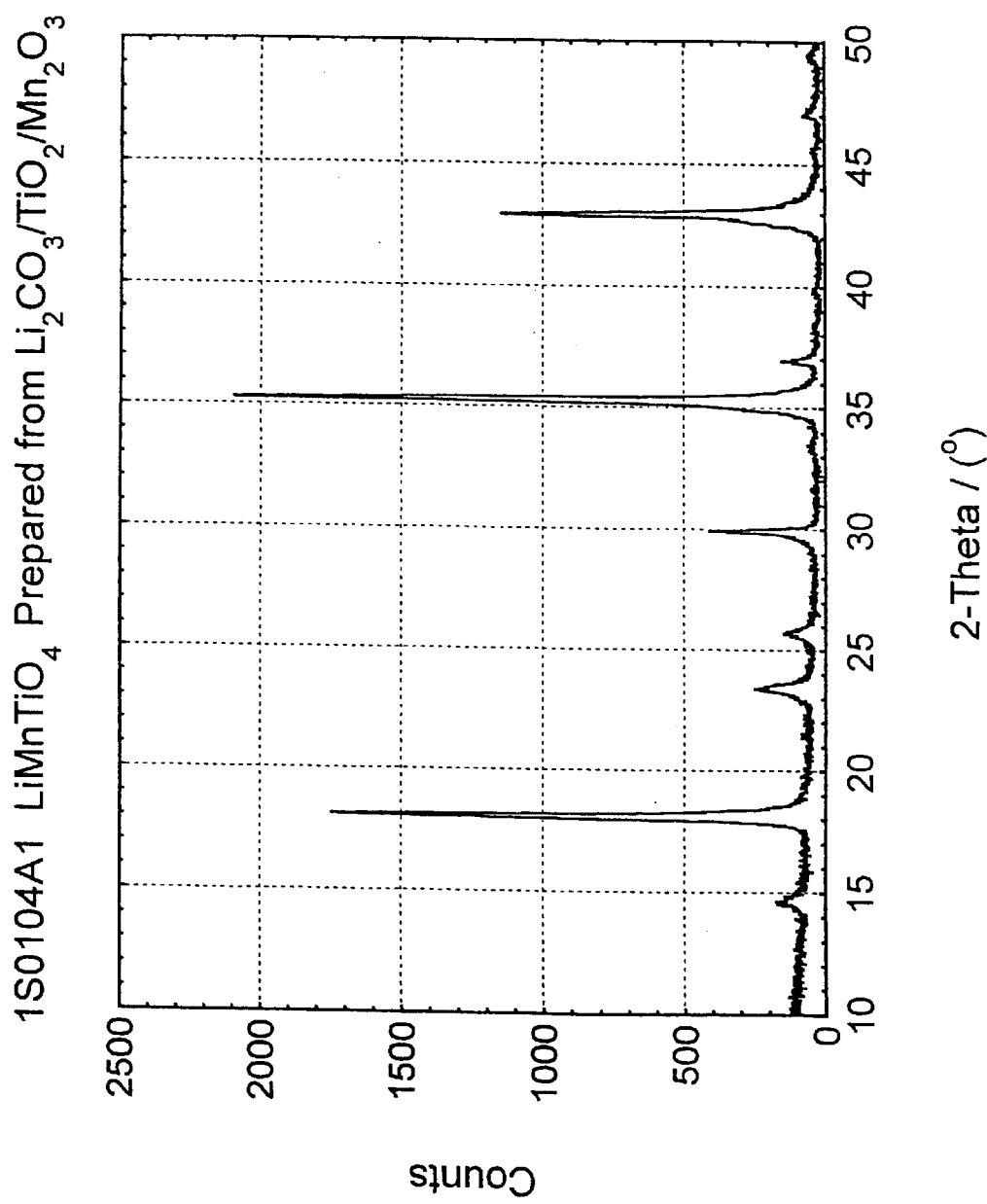
FIG. 4 is an x-ray diffraction pattern of synthesized $LiMnTiO_4$.

FIG. 4 shows the x-ray diffraction pattern for this $LiMnTiO_4$ sample. The data appear fully consistent with the published data of Arillo et al. Solid State Ionics 107, 307 (1998) for the compositionally similar $LiFeTiO_4$. In the Fe material the x-ray diffraction data is consistent for a cubic spinel structure with the space group Fd3m.

Example 7

Preparation of $LiFeTiO_4$ from $Li_2CO_3/TiO_2/Fe_2O_3$

The general reaction may be summarized:

0.5 $Li_2CO_3$+$TiO_2$+0.5 $Fe_2O_3$→$LiFeTiO_4$+0.5 $CO_2$ 0.5 g-mol of $Li_2CO_3$ is equivalent to 36.95 g 1.0 g-mol of $TiO_2$ is equivalent to 79.88 g 0.5 g-mol of $Fe_2O_3$ is equivalent to 79.85 g 1.69 g of $Li_2CO_3$ (Pacific Lithium Company), 3.66 g of $TiO_2$ (Aldrich Chemical) and 3.66 g of $Fe_2O_3$ (Aldrich Chemical) were used. The precursors were initially pre-mixed using a mortar and pestle and the mixture was then pelletized. The pellet was then transferred to a temperature-controlled tube furnace equipped with an argon gas flow. The sample was heated at a ramp rate of 2°/minute to an ultimate temperature of 900° C. and maintained at this temperature for 8 hours. The sample was then cooled to room temperature, before being removed from the tube furnace for analysis. The powderized sample showed good uniformity, was very hard and appeared brick red in color.

Figure 5:
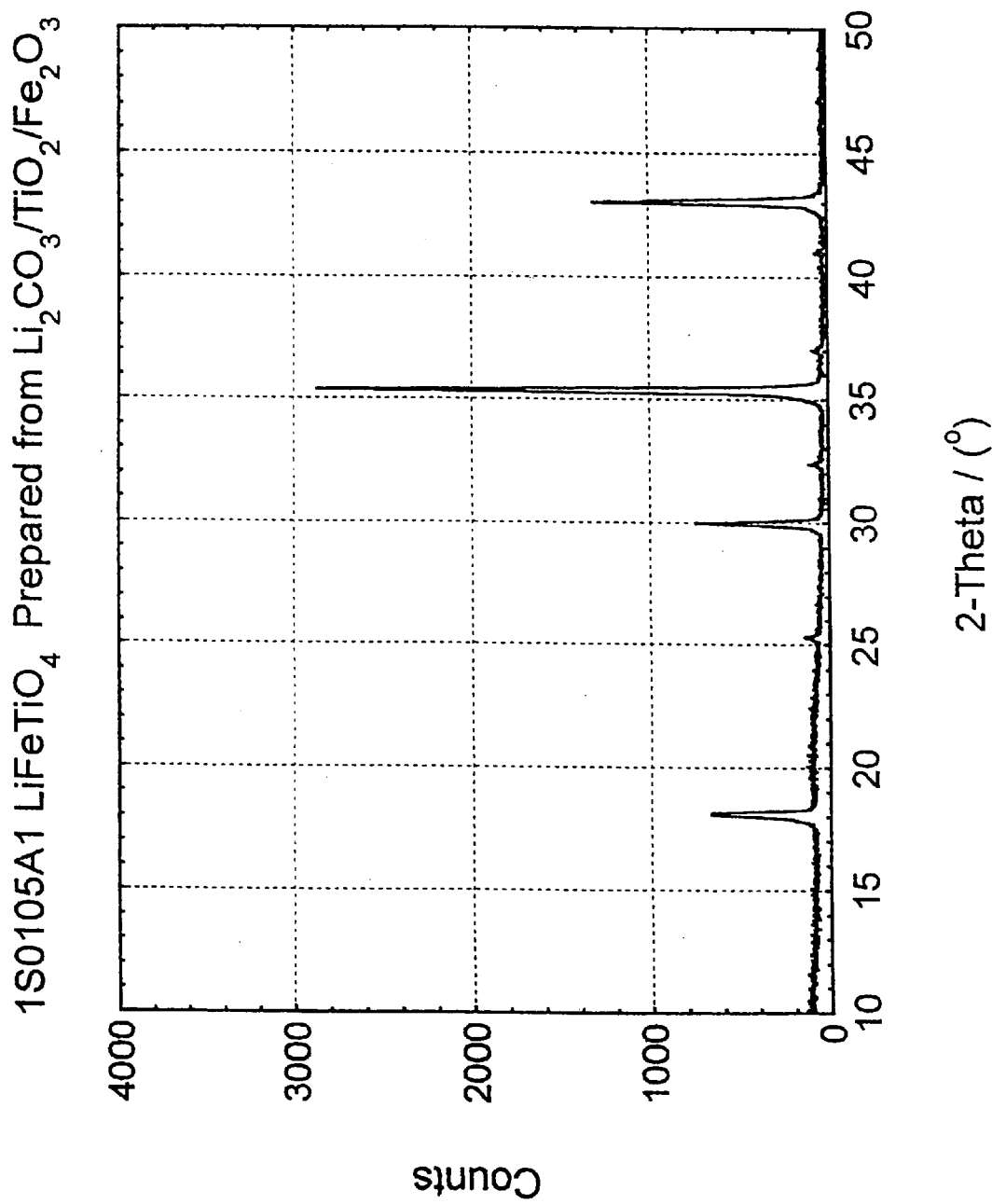
FIG. 5 is an x-ray diffraction pattern of synthesized $LiFeTiO_4$.

FIG. 5 shows the x-ray diffraction pattern for this $LiFeTiO_4$ sample. Structural refinement gives cubic space group Fd3m, a=8.432 Å and a unit cell volume of 581.96 Å3. This is isostructural with the published data of Arillo et al. Solid State Ionics 107, 307 (1998) for their own prepared $LiFeTiO_4$ material.

Example 8

Preparation of $LiCoTiO_4$ from $LiCoO_2/TiO_2$

The general reaction may be summarized:

$LiCoO_2$+$TiO_2$→$LiCoTiO_4$ 1.0 g-mol of $LiCoO_2$ is equivalent to 97.87 g 1.0 g-mol of $TiO_2$ is equivalent to 79.88 g 4.40 g of $LiCoO_2$ (Sherrett-Westaim Company) and 3.60 g of $TiO_2$ (Aldrich Chemical) were used. The precursors were initially pre-mixed using a mortar and pestle and the mixture was then pelletized. The pellet was then transferred to a temperature-controlled tube furnace equipped with an argon gas flow. The sample was heated at a ramp rate of 2°/minute to an ultimate temperature of 900° C. and maintained at this temperature for 8 hours. The sample was then cooled to room temperature, before being removed from the tube furnace for analysis. The powderized sample showed good uniformity, was very hard and appeared turquoise blue-green in color.

Figure 6:
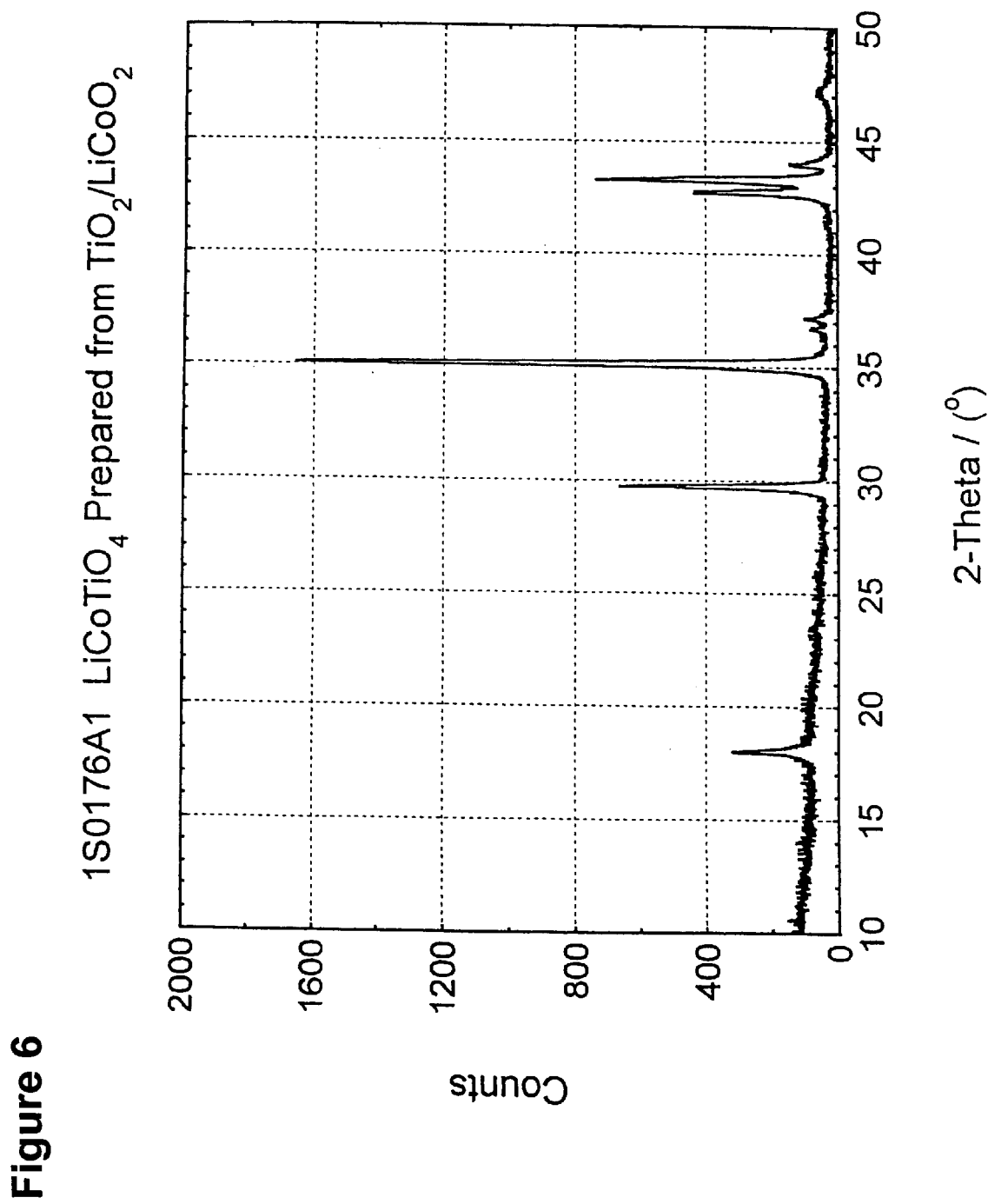
FIG. 6 is an x-ray diffraction pattern of synthesized $LiCoTiO_4$.

FIG. 6 shows the x-ray diffraction pattern for this $LiCoTiO_4$ sample. The data appear fully consistent with the published data of Arillo et al. Solid State Ionics 107, 307 (1998) for the compositionally similar $LiFeTiO_4$. In the Fe material the x-ray diffraction data is consistent for a cubic spinel structure with the space group Fd3m.

Example 9

Preparation of $LiNiTiO_4$ from $Li_2CO_3/TiO_2/$ $2NiCO_3.3Ni(OH)_2.4H_2O$

The general reaction may be summarized:

0.5 $Li_2CO_3$+$TiO_2$+0.2 [$2NiCO_3.3Ni(OH)_2.4H_2O$] →$LiNiTiO_4$+0.9 $CO_2$+1.4 $H_2O$ 0.5 g-mol of $Li_2CO_3$ is equivalent to 36.95 g 1.0 g-mol of $TiO_2$ is equivalent to 79.88 g 0.2 g-mol of $2NiCO_3.3Ni(OH)_2.4H_2O$ is equivalent to 117.5 g 2.08 g of $Li_2CO_3$ (Pacific Lithium Company), 4.49 g of $TiO_2$ (Aldrich Chemical) and 6.63 g of $2NiCO_3.3Ni(OH)$ $2.4H_2O$ (Aldrich Chemical) were used. The precursors were initially pre-mixed using a mortar and pestle and the mixture was then pelletized. The pellet was then transferred to a temperature-controlled tube furnace equipped with an oxygen gas flow. The sample was heated at a ramp rate of 2°/minute to an ultimate temperature of 850° C. and maintained at this temperature for 8 hours. The sample was then cooled to room temperature, before being removed from the tube furnace for analysis. The powderized sample showed reasonable uniformity, was soft and appeared mainly yellow in color.

Example 10

Preparation of $LiMZrO_4$ from $Li_2CO_3/ZrO_2/M_2O_3$

The general reaction may be summarized:

$0.5Li_2CO_3$+$ZrO_2$+$0.5M_2O_3$→$LiMZrO_4$+$0.5CO_2$.

0.5 g-mol of $Li_2CO_3$ is equivalent to 36.95 g.

1.0 g-mol of $ZrO_2$ is equivalent to 123.22 g.

0.5 g-mol of $M_2O_3$ varies according to M.

The reaction is carried out according to the conditions of Example 1. Preferably, the temperature of reaction is above 1000° to react the $ZrO_2$.

Example 11

Preparation of $LiMZr_{1-x}Ti_xO_4$ from $Li_2CO_3/TiO_2/$ $ZrO_2/M_2O_3$

The general scheme is 0.5 $Li_2CO_3$+(1−x) $ZrO_2$+$xTiO_2$+ 0.5 $M_2O_3$→$LiMZr_{1-x}Ti_xO_4$ The reaction for x=0.5 may be summarized:

0.5 $Li_2CO_3$+0.5 $ZrO_2$+0.5 $TiO_2$+0.5 $M_2O_3$→$LiMZr_{0.5}Ti_{0.5}O_4$ 0.5 g-mol of $Li_2CO_3$ is equivalent to 36.95 g.

0.5 g-mol of $ZrO_2$ is equivalent to 61.61 g.

0.5 g-mol of $TiO_2$ is equivalent to 39.94 g.

0.5 g-mol of $M_2O_3$ varies according to M.

The reaction is carried out according to the conditions of Example 1. Preferably, the temperature of reaction is above 1000° to react the $ZrO_2$.

Example 12

Preparation of $LiMZr_{1-x}Ti_xO_x$—using hydrogen

The general reaction for x=0.5 and for M=vanadium may be summarized.

0.5$Li_2CO_3$+0.5$ZrO_2$+0.5$TiO_2$+0.5$V_2O_5$+ $H_2$→$LiMZr_{0.5}Ti_{0.5}O_4$+$0.5CO_2$+$H_2O$ 0.5 g-mol of $Li_2CO_3$=36.95 g
0.5 g-mol of $ZrO_2$=61.61 g
0.5 g-mol of $TiO_2$=39.94 g
0.5 g-mol of $V_2O_5$=90.94 g The reaction is carried out according to Example 3. Preferably, the temperature of reaction is above 1000° to react the $ZrO_2$.

Example 13

Preparation of $LiMZr_{1-x}Ti_xO_4$ by Carbothermal Reduction

The general reaction for the case where M is vanadium may be summarized:

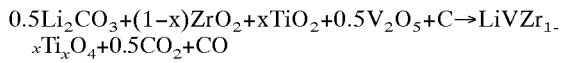

For x=0.5:

0.5 g-mol of $Li_2CO_3$=36.95 g
0.5 g-mol of $ZrO_2$=61.61 g
0.5 g-mol of $TiO_2$=39.94 g
0.5 g-mol of $V_2O_5$=90.94 g
1.0 g-mol of carbon=12.00 g The reaction is carried out according to Example 4. Assumes C→CO reaction scheme for carbothermal reduction. Excess carbon, for example up to 100% weight excess, may be used. Preferably, the temperature of reaction is in the range of 700–1050° C.

Example 14

Preparation of $LiM'_aM''_{1-a}Ti_bZr_{1-b}O_4$

Examples of non-transition metals: B, Al, Ga and In, all of which are normally available as $M''_2O_3$ oxides e.g. $Al(OH)_3$, $Ga(OH)_3$, $In(OH)_3$. They are also available as $M''(OH)_3$ hydroxides, e.g., $Al(OH)_3$, $Ga(OH)_3$ and $In(OH)_3$.

The general reaction scheme is:

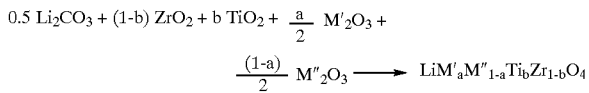

The reaction requires:

0.5 g-mol of $Li_2CO_3$
(1-b) g-mol of $ZrO_2$
(b) g-mol of $TiO_2$
a/2 g-mol of $M'_2O_3$
(1-a)/2 g-mol of $M''_2O_3$ Reaction is carried out as in Example 1. A temperature above 1000° C. may be necessary to react $ZrO_2$.

Electrochemical Characterization of Active Materials:

For electrochemical evaluation purposes the active materials were cycled against a lithium metal counter electrode. The active materials were used to formulate the positive electrode. The electrode was fabricated by solvent casting a slurry of the active material, conductive carbon, binder and solvent. The conductive carbon used was Super P (MMM Carbon). Kynar® Flex 2801 was used as the binder and electronic grade acetone was used as the solvent. The slurry was cast onto glass and a free-standing electrode film was formed as the solvent evaporated. The proportions are as follows on a weight basis: 80% active material; 8% Super P carbon; and 12% Kynar binder.

For all electrochemical measurements the liquid electrolyte was ethylene carbonate/dimethyl carbonate, EC/DMC (2:1 by weight) and 1 M LiPF6. This was used in conjunction with a Glass Fiber filter to form the anode-cathode separator. Routine electrochemical testing was carried out on a commercial battery cycler using constant current cycling between pre-set voltage limits. High-resolution electrochemical data were collected using the Electrochemical Voltage Spectroscopy (EVS) technique. Such technique is known in the art as described in Synth. Met. D217 (1989); Synth. Met. 32, 43 (1989); J. Power Sources, 52, 185 (1994); and Electrochimica Acta 40, 1603 (1995).

Electrochemical Characterization of $LiVTiO_4$

Figure 7:
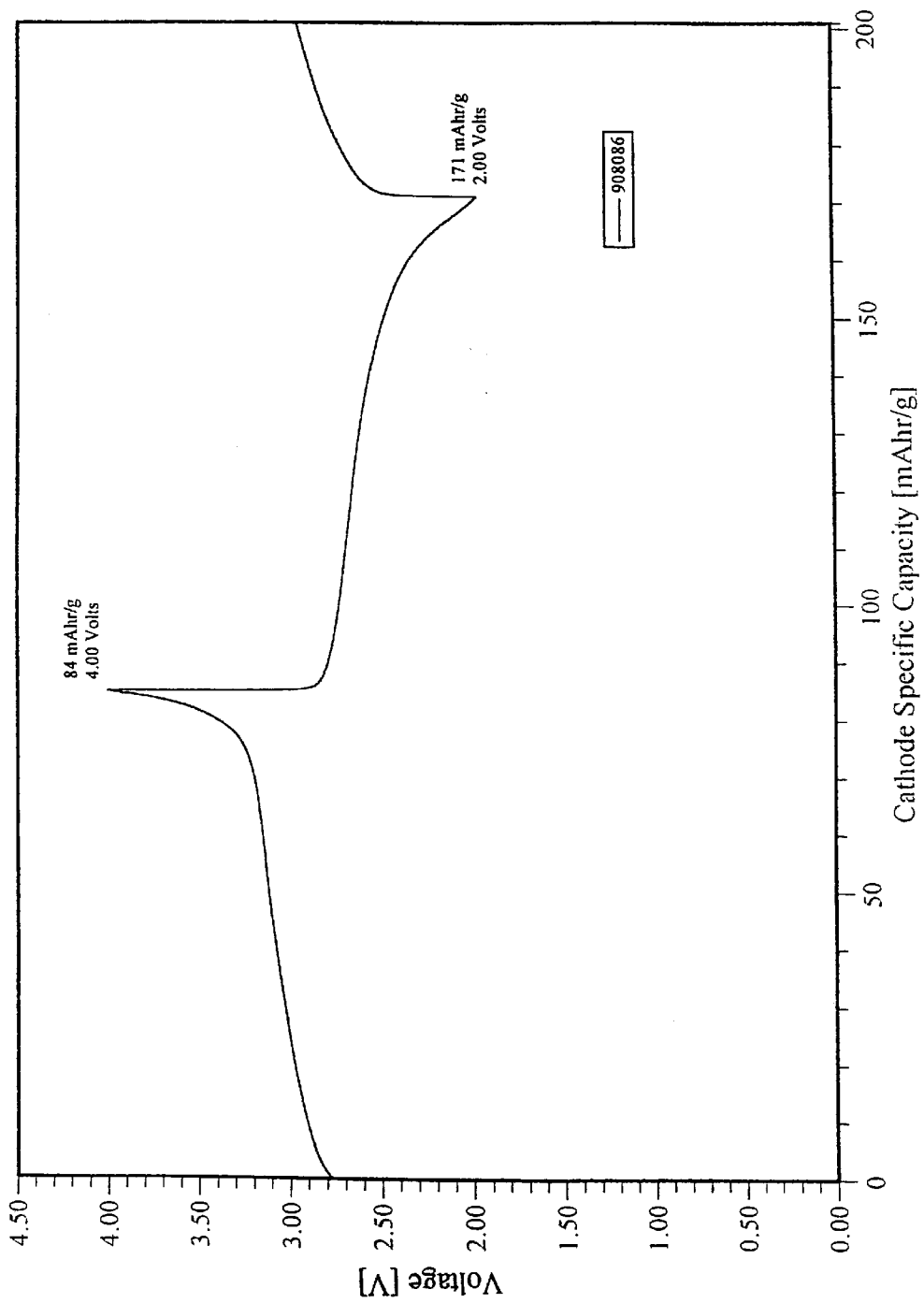
FIG. 7 is a first cycle constant current data of $LiVTiO_4$ made from lithium carbonate.

FIG. 7 (Cell#908086) shows the first cycle constant current data of the $LiVTiO_4$ material made from $Li_2CO_3/TiO_2N_2O_3$. The data were collected using a lithium metal counter electrode at 0.2 mA/cm² between 2.00 and 4.00 V and are based upon 27.2 mg of the $LiVTiO_4$ active material in the positive electrode. The testing was carried out at 23° C. The initial measured open circuit voltage (OCV) was approximately 2.70 V vs. Li. Lithium is extracted from the $LiVTiO_4$ during charging of the cell. A charge equivalent to a material specific capacity of 84 mAh/g is extracted from the cell. The theoretical specific capacity for $LiVTiO_4$ (assuming all the lithium is extracted) is 158 mAh/g. Consequently, the positive electrode active material corresponds to $Li_{1-x}VTiO_4$ where x equates to about 0.53, when the active material is charged to about 4.00 V vs. Li. When the cell is discharged to approximately 2.00 V a quantity of lithium is re-inserted into the $Li_{1-x}VTiO_4$. The re-insertion process corresponds to approximately 87 mAh/g, indicating a good reversibility of the $LiVTiO_4$ material. At 2.00 V the positive active material corresponds to approximately $Li_{1.02}VTiO_4$. The generally symmetrical nature of the charge-discharge curves further indicates the good reversibility of the system.

Figure 8:
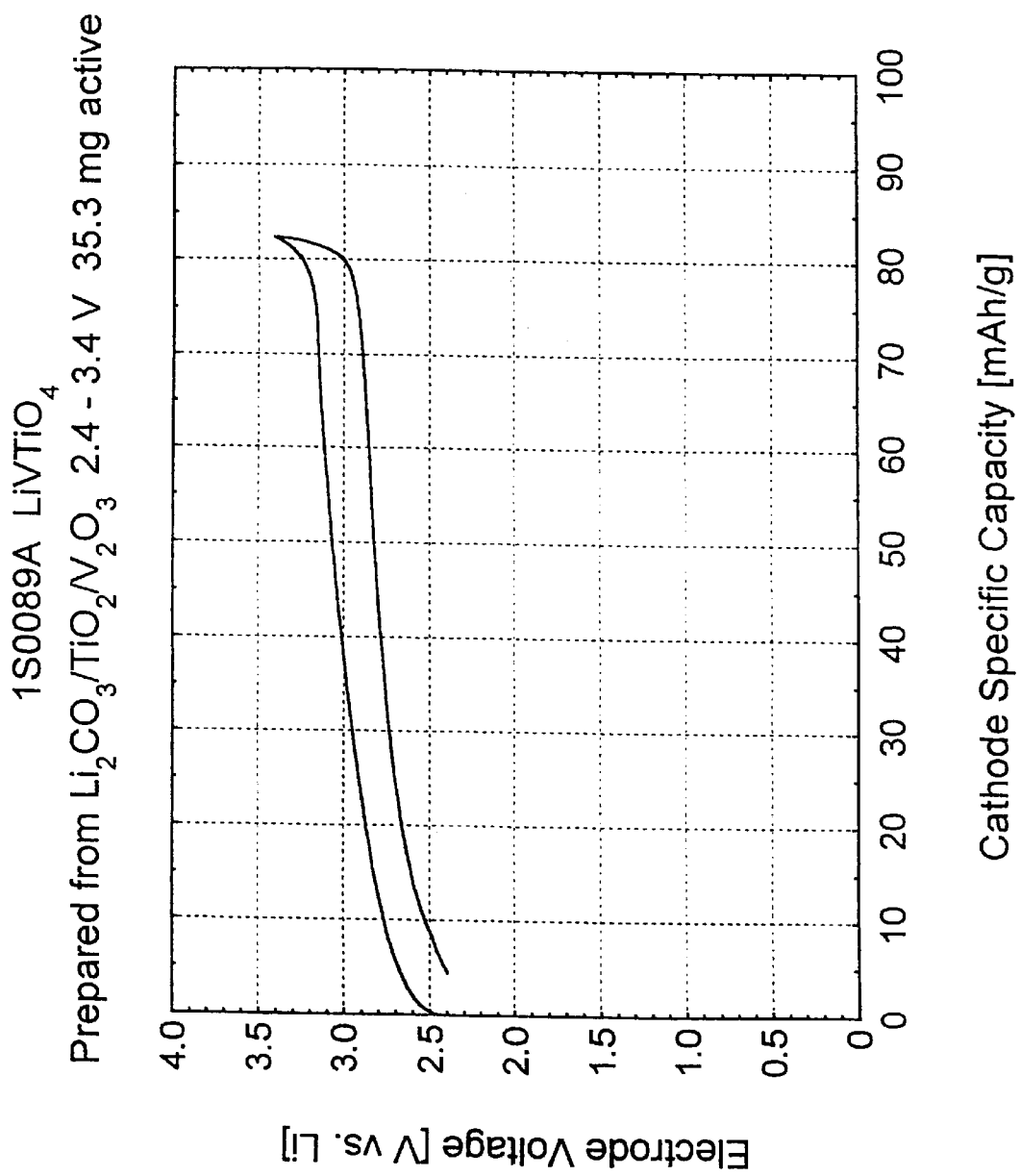
FIG. 8 shows electrode voltage data for $LiVTiO_4$ made from lithium carbonate.
Figure 9:
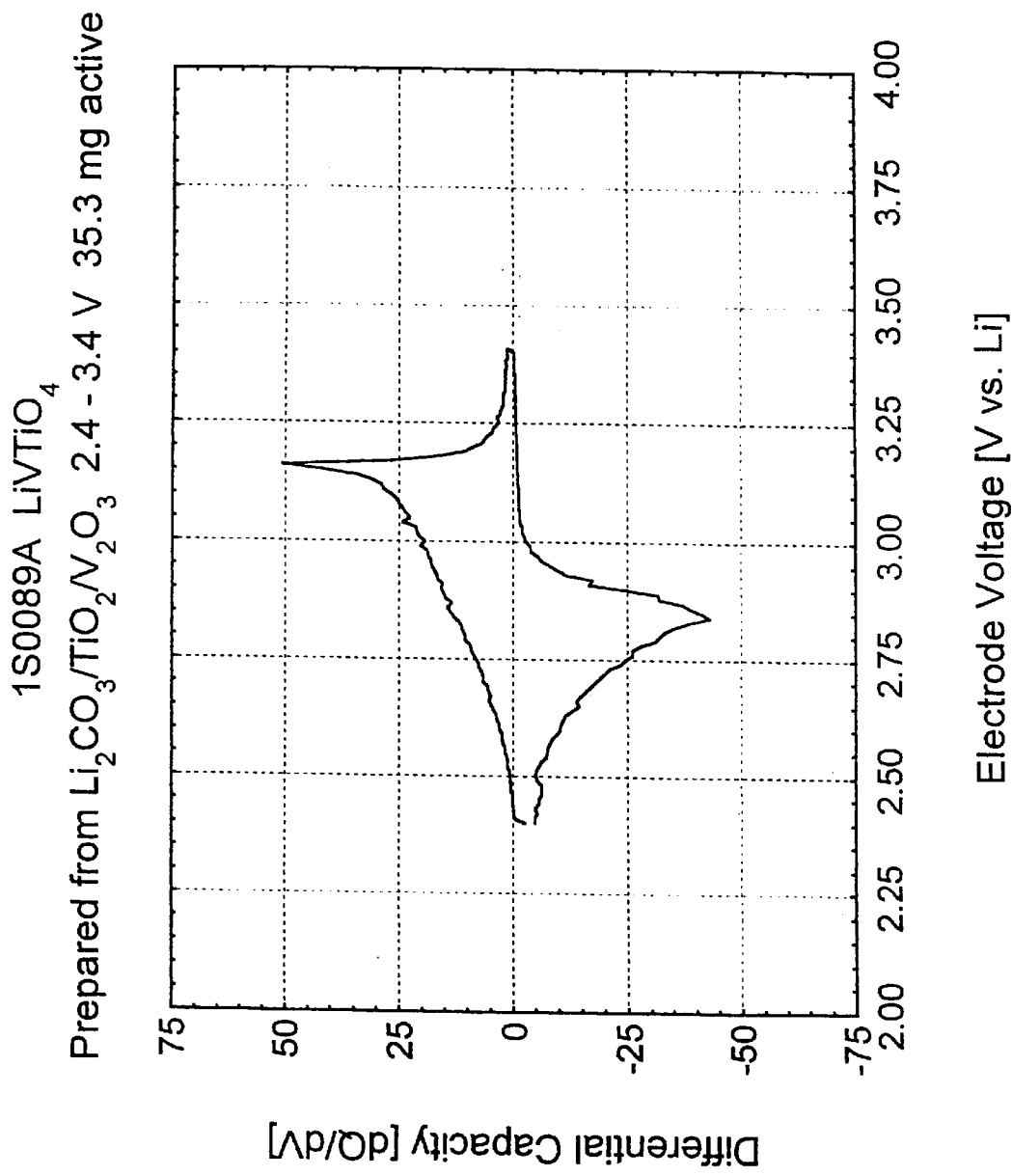
FIG. 9 shows a differential capacity data for $LiVTiO_4$ made from lithium carbonate.

The $LiVTiO_4$ material made from $Li_2CO_3/TiO_2/V_2O_3$ was further subjected to high resolution electrochemical testing using the Electrochemical Voltage Spectroscopy (EVS) technique. FIG. 8 shows the electrode voltage versus specific capacity data for this material when cycled between voltage limits of 2.40 and 3.40 V. The weight of the active material was 35.3 mg and the test was carried out at 23° C. A charge equivalent to a material specific capacity of 82 mAh/g is extracted from the cell. Thus, when fully charged the positive electrode active material, represented by $Li_{1-x}VTiO_4$, corresponds to $Li_{0.48}VTiO_4$. The re-insertion process corresponds to approximately 78 mAh/g, indicating a good reversibility of the $LiVTiO_4$ material. The capacity corresponding to the lithium extraction process is essentially the same as the capacity corresponding to the subsequent lithium insertion process. Thus, there is essentially no capacity loss. FIG. 9, the differential capacity data, also indicates good reversibility. The symmetrical nature of the peaks indicates the good electrochemical reversibility. Further, there is low peak separation (charge/discharge) and good correspondence between the broad peak above and below the zero axis. There are essentially no peaks that can be related to irreversible reactions. Overall, this EVS test demonstrates that the preparative procedure used to make this material produces a high quality electrode material.

Figure 10:
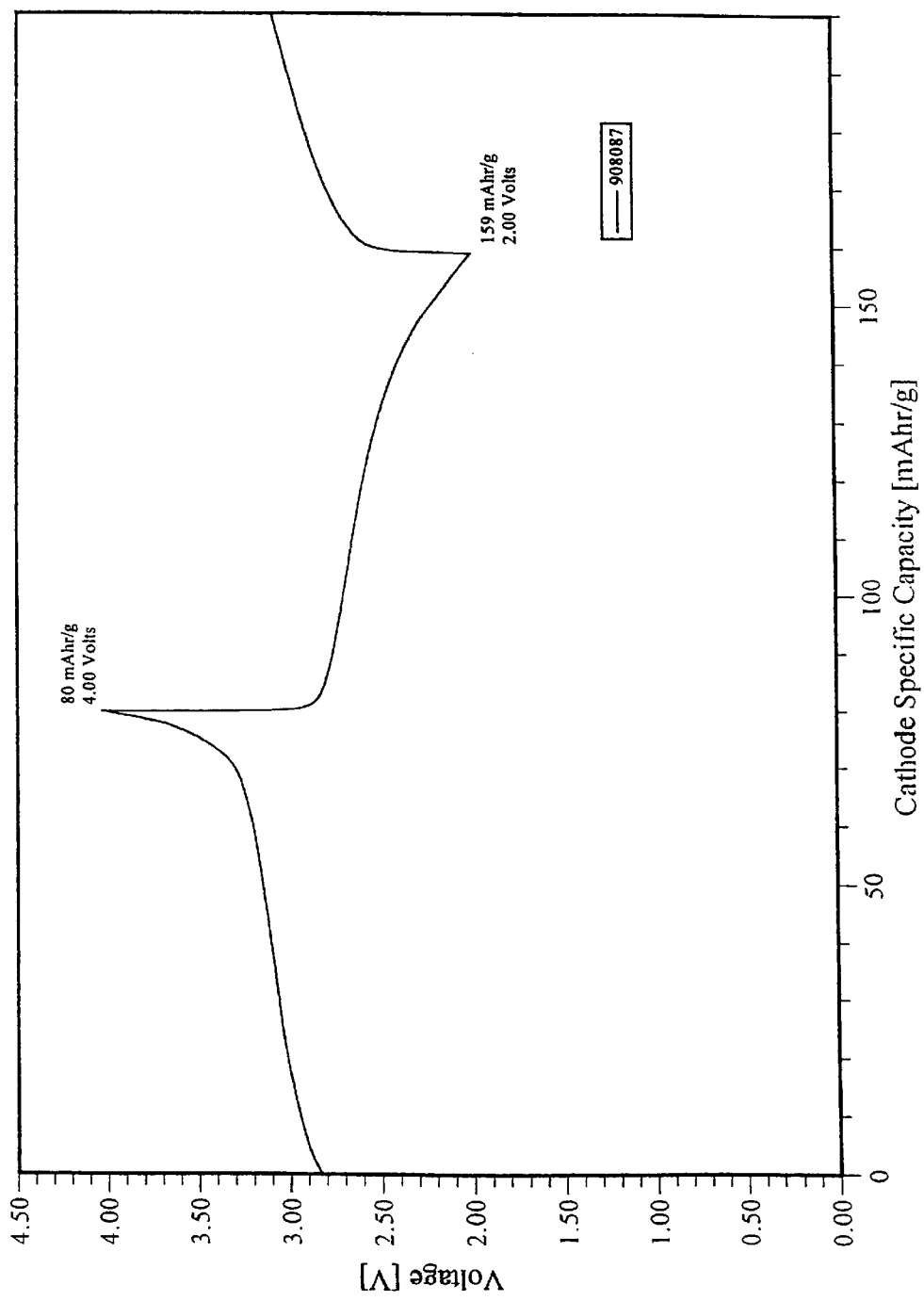
FIG. 10 shows a first cycle constant current data of $LiVTiO_4$ made from lithium hydroxide.

FIG. 10 (Cell#908087) shows the first cycle constant current data of the $LiVTiO_4$ material made from $LiOH.H_2O/TiO_2/V_2O_3$. The data were collected using a lithium metal counter electrode at 0.2 mA/cm² between 2.00 and 4.00 V and are based upon 22.6 mg of the $LiVTiO_4$ active material in the positive electrode. The testing was carried out at 23°

C. The initial measured open circuit voltage (OCV) was approximately 2.80 V vs. Li. Lithium is extracted from the $LiVTiO_4$ during charging of the cell. A charge equivalent to a material specific capacity of 80 mAh/g is extracted from the cell. The theoretical specific capacity for $LiVTiO_4$ (assuming all the lithium is extracted) is 158 mAh/g. Consequently, the positive electrode active material corresponds to $Li_{1-x}VTiO_4$ where x equates to about 0.51, when the active material is charged to about 4.00 V vs. Li. When the cell is discharged to approximately 2.00 V a quantity of lithium is re-inserted into the $Li_{1-x}VTiO_4$. The re-insertion process corresponds to approximately 79 mAh/g, indicating excellent reversibility of the $LiVTiO_4$ material. At 2.00 V the positive active material corresponds to approximately $Li_{1.00}VTiO_4$. The generally symmetrical nature of the charge-discharge curves further indicates the good reversibility of the system. The data collected from this material is fully consistent with the equivalent data collected—shown above—for the $LiVTiO_4$ made from $Li_2CO_3/TiO_2/V_2O_3$ route.

It has been noted above that about 50% of the available lithium is extracted from the $LiVTiO_4$ structure. Without being bound by theory, it is likely that the structure of all $LiMTiO_4$ materials may be characterized as cubic spinel with the space group Fd3m. The cubic spinel structure, $A[B_2]O4$ is characterized by cubic-closed packed oxygen ions occupying the 32e sites, the A cations located in the tetrahedral 8a sites and the B cations located in octahedral 16d sites. This is the same structure as the lithiated manganese spinel $LiMn_2O_4$, the well-known cathode active material used in commercial lithium ion applications. In stoichiometric $LiMn_2O_4$ spinel, in which the alkali metal cations are all located in the tetrahedral 8a sites and the Mn cations occupy the octahedral 16c sites, it is possible to extract almost all the lithium from the structure. In the paper by Arillo et al. it is reported that in the $LiFeTiO_4$ structure there exists a different situation in which there is a distribution of alkali metal cations over both the 8a and 16 c sites. Thus, only about 50% of the lithium cations are actually located on the tetrahedral 8a sites, the remaining lithium cations located in the octahedral sites. This suggests that only around half the lithium ions will be available for extraction and therefore only 50% of the theoretical specific capacity would be realized in operation. This is close to what is observed experimentally in this work.

Electrochemical Characterization of $LiCrTiO_4$

Figure 11:
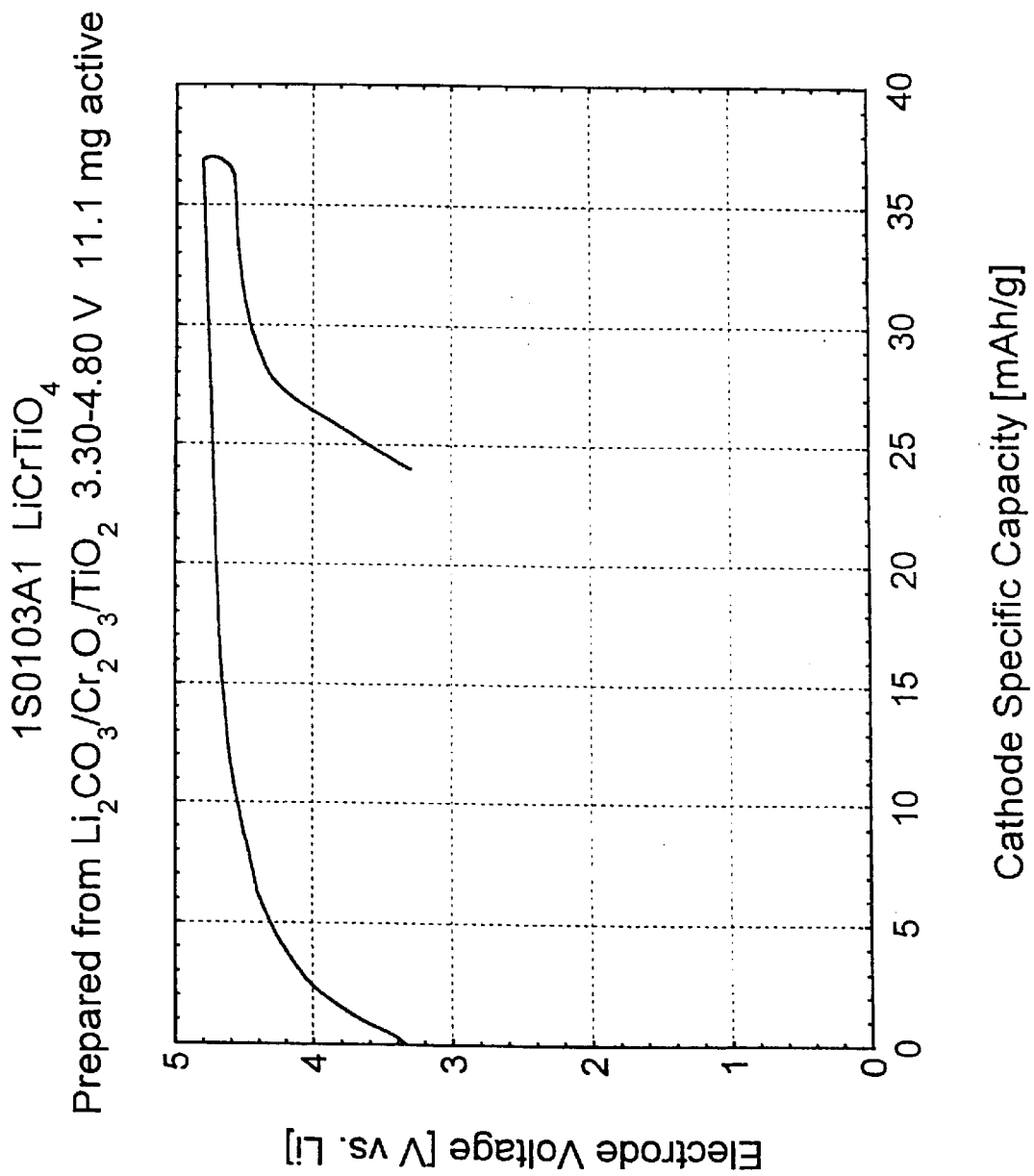
FIG. 11 shows electrode voltage data for $LiCrTiO_4$ as cathode.

The $LiCrTiO_4$ material made from $Li_2CO_3/TiO_2/Cr_2O_3$ was tested using the Electrochemical Voltage Spectroscopy (EVS) technique. FIG. 11 shows the electrode voltage versus specific capacity data for this material when cycled between voltage limits of 3.40 and 4.80 V. The weight of the active material was 11.1 mg and the test was carried out at 23° C. A charge equivalent to a material specific capacity of 37 mAh/g is extracted from the cell. The re-insertion process corresponds to approximately 13 mAh/g, indicating a relatively high irreversible capacity loss for the EVS cycle. Bearing in mind the extremely high operating voltage for this material—around 4.6 V vs. Li—the level of irreversibility is not surprising. At such extreme operating potentials it is well known that the electrochemical system will become very unstable. Several irreversible reactions will be expected to occur, such as electrolyte solvent electrolysis, electrode binder breakdown, as well as positive electrode current-collector degradation. These factors will detrimentally affect the experimental results. What is particularly interesting is the fact that there still exists significant (reversible) electrode activity at such high potentials. Indeed, it is probable that in a more stable electrolyte system a significantly higher specific capacity would be realized. There are very few known insertion materials that can operate at such oxidative conditions as those shown here for the $LiCrTiO_4$.

Figure 12:
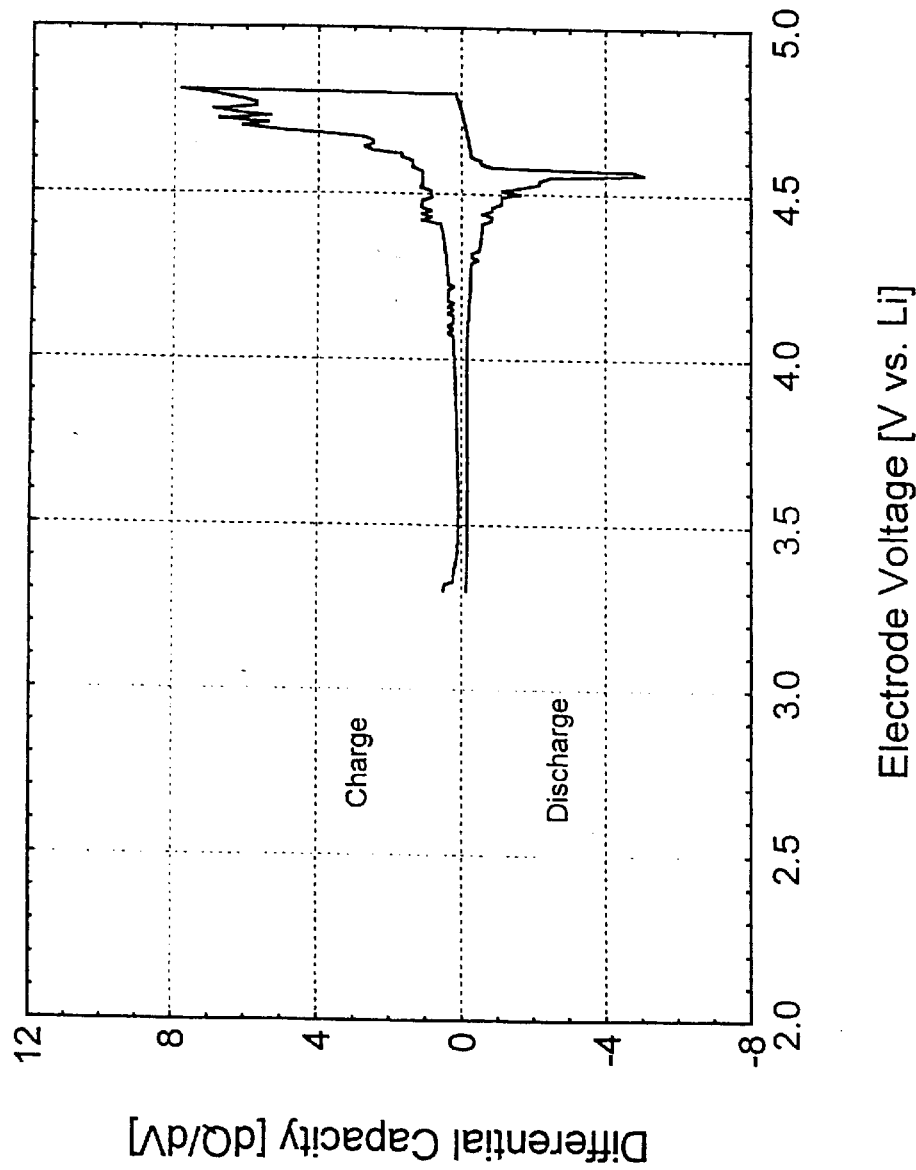
FIG. 12 shows differential capacity data for $LiCrTiO_4$ as cathode.

FIG. 12, the differential capacity data, also indicates the $LiCrTiO_4$ material insertion activity. Close inspection of this figure allows the reversible insertion reactions to be resolved—part of the broad charge peak above the x-axis is clearly reversible during the insertion process shown below the x-axis. However, as expected from the high irreversible capacity loss described in FIG. 10, there are clearly other non-reversible reactions also occurring during the cycle.

In separate experiments the discharge or lithium insertion properties of the as-made $LiCrTiO_4$ material were probed. Such measurements are useful in determining the low voltage insertion behavior of materials in order to evaluate these compounds as potential negative (anode) materials for lithium ion cells. In such trials on the $LiCrTiO_4$ material, three possible reduction reactions may be proposed:

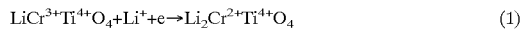
$$LiCr^{3+}Ti^{4+}O_4 + Li^+ + e \rightarrow Li_2Cr^{2+}Ti^{4+}O_4 \quad (1)$$

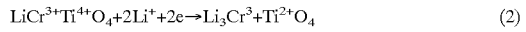
$$LiCr^{3+}Ti^{4+}O_4 + 2Li^+ + 2e \rightarrow Li_3Cr^{3+}Ti^{2+}O_4 \quad (2)$$

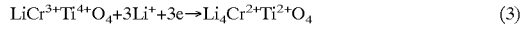
$$LiCr^{3+}Ti^{4+}O_4 + 3Li^+ + 3e \rightarrow Li_4Cr^{2+}Ti^{2+}O_4 \quad (3)$$

Based on a molecular mass of 170.8 for $LiCrTiO_4$, approximate specific capacities of 157 mAh/g, 314 mAh/g and 471 mAh/g may be calculated for the reactions (1), (2) and (3) respectively.

Figure 13:
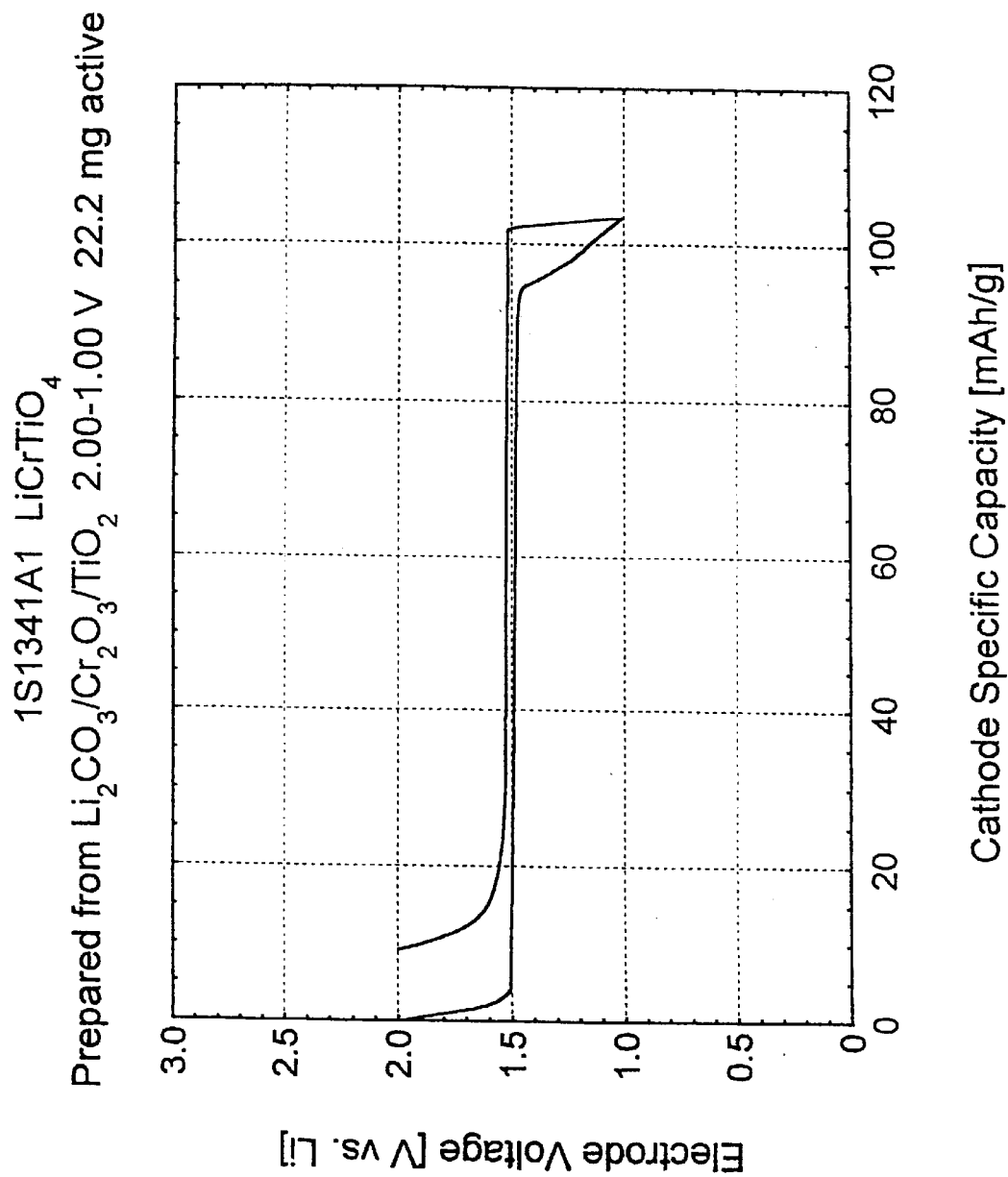
FIG. 13 shows electrode voltage data for $LiCrTiO_4$ as anode.

The anode properties of the $LiCrTiO_4$ material were probed using the EVS method. FIG. 13 shows the electrode voltage versus specific capacity data for the $LiCrTiO_4$ material when cycled between voltage limits of 2.00 and 1.00 V. The weight of the active material was 22.2 mg and the test was carried out at 23° C. During the discharge process the active material may be represented as $Li_{1+x}CrTiO_4$ indicating the increasing amount of Li in the structure. The material demonstrates a flat voltage plateau at around 1.5 V vs. Li, indicating the insertion of lithium into the structure. The discharge process is equivalent to a specific capacity of around 103 mAh/g and based on its molecular mass, the stoicheometry of the active material when discharged to 1.00 V, may be estimated as $Li_{1.66}CrTiO_4$. When subsequently charged to 2.00 V, a charge equivalent to a material specific capacity of 94 mAh/g is extracted from the cell indicating the excellent reversibility of the $LiCrTiO_4$ material. In the fully charged state, the active material corresponds to approximately $Li_{1.06}CrTiO_4$. The generally symmetrical nature of the charge-discharge curve, and the small voltage difference, further indicates the good reversibility of the system.

Figure 14:
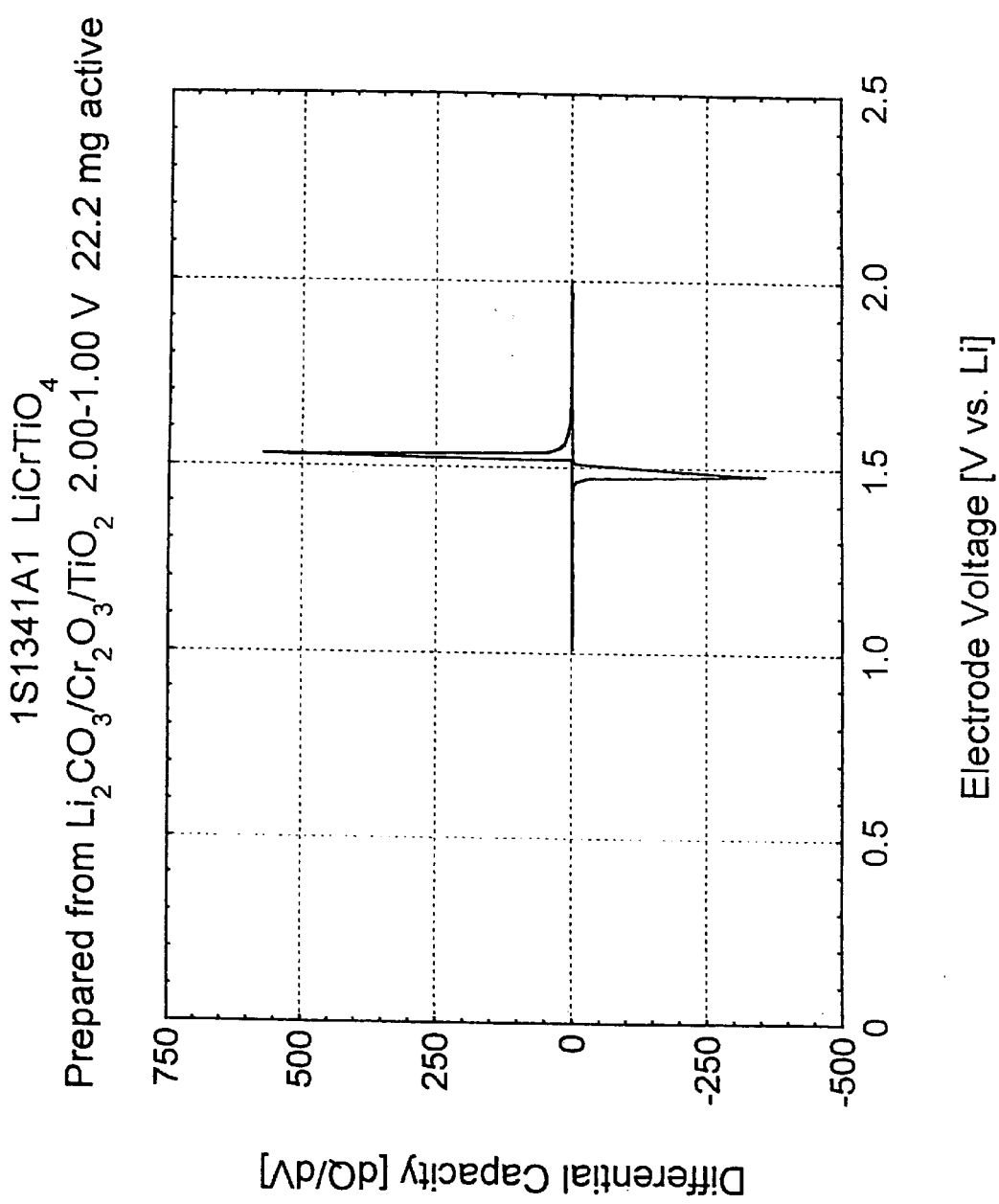
FIG. 14 shows differential capacity data for $LiCrTiO_4$ as anode.

FIG. 14, the differential capacity data, indicates excellent reversibility. The symmetrical nature of the peaks indicates good electrochemical reversibility; there is very small peak separation (discharge/charge) and good correspondence between peaks above and below the zero axis. There are essentially no peaks that can be related to irreversible reactions, since the peak above the axis (cell charge) has a corresponding peak below the axis (cell discharge). These data demonstrate that the preparative procedure used to make this material produces a high quality electrode material.

We claim:
1. A method for synthesizing a compound, comprising:
  forming a mixture comprising a lithium compound; at least one metal-containing compound; and a titanium compound, a zirconium compound or a mixture thereof;

heating the mixture in the presence of a reducing agent at a temperature and for a time sufficient to form a reaction product;

wherein the reaction product has a cubic spinel structure and is represented by the general formula:

$$Li_n M'_a M''_{1-a} Ti_b Zr_{1-b} O_4$$

wherein n is from about 0.01 to 2, a is greater than or equal to 0 and less than or equal to 1, b is greater than or equal to 0 and less than or equal to 1, M' is selected from the group consisting of transition metals and mixtures thereof, and M'' is selected from the group consisting of valence +3 non-transition metals and mixtures thereof.

2. The method according to claim 1, wherein the mixture consists of a lithium compound; at least one transition metal-containing compound; and a titanium compound, a zirconium compound or a mixture thereof.

3. The method according to claim 2, wherein the lithium compound is selected from the group consisting of lithium acetate, lithium hydroxide, lithium nitrate, lithium oxalate, lithium oxide, lithium phosphate, lithium dihydrogen phosphate, lithium carbonate, and mixtures thereof.

4. The method according to claim 2, wherein the mixture further consists of at least one non-transition metal-containing compound.

5. The method according to claim 4, wherein the mixture further consists of a carbon.

6. The method according to claim 5, wherein the at least one non-transition metal-containing compound is selected from the group consisting of compounds of aluminum, boron, indium, gallium, antimony, bismuth and thallium, and mixtures thereof.

7. The method according to claim 6, wherein the at least one transition metal-containing compound is selected from the group consisting of compounds of vanadium, manganese, iron, chromium, nickel, cobalt, molybdenum and niobium, and mixtures thereof.

8. The method according to claim 2, wherein the mixture further consists of a carbon.

9. The method according to claim 1 wherein the lithium compound is selected from the group consisting of lithium acetate, lithium hydroxide, lithium nitrate, lithium oxalate, lithium oxide, lithium phosphate, lithium dihydrogen phosphate, lithium carbonate, and mixtures thereof.

10. The method according to claim 9, wherein the lithium compound is lithium carbonate.

11. The method according to claim 1, wherein the at least one metal-containing compound is selected from the group consisting of compounds of vanadium, manganese, iron, chromium, nickel, cobalt, molybdenum and niobium, and mixtures thereof.

12. The method according to claim 1, wherein the at least one metal-containing compound is selected from the group consisting of a transition metal oxide, hydroxide, phosphate, hydrogen phosphate, dihydrogen phosphate, nitrate, acetate and oxalate, and mixtures thereof.

13. The method according to claim 1, wherein the metal-containing compound is a transition metal oxide or hydroxide.

14. The method according to claim 1, wherein the mixture comprises a vanadium-containing compound.

15. The method according to claim 1, wherein the mixture comprises a titanium compound.

16. The method according to claim 15, wherein the titanium compound is titanium dioxide.

17. The method according to claim 1, wherein the mixture comprises a zirconium compound.

18. The method according to claim 17, wherein the zirconium compound is zirconium dioxide.

19. The method according to claim 1, wherein the mixture further comprises least one non-transition metal-containing compound.

20. The method according to claim 19, wherein the at least one non-transition metal-containing compound is selected from the group consisting of compounds of aluminum, boron, indium, gallium, antimony, bismuth and thallium, and mixtures thereof.

21. The method according to claim 1, wherein during the heating step, a metal of at least one metal-containing compound is reduced to a lower oxidation state.

22. The method according to claim 1, wherein the reducing agent is carbon.

23. The method according to claim 22, wherein the carbon is generated in situ by decomposition of an organic material.

24. The method according to claim 11, wherein the reducing agent is hydrogen gas.

25. The method according to claim 1, wherein the reaction product has a cubic spinel structure and is represented by the general formula $LiVXO_4$, wherein X is selected from the group consisting of titanium, zirconium, and mixtures thereof.

26. The method according to claim 1, wherein the reaction product is $LiVTiO_4$.

27. The method according to claim 1, wherein the reaction product is $LiCrTiO_4$.

* * * * *